(12) United States Patent
Wendling

(10) Patent No.: US 8,607,266 B2
(45) Date of Patent: Dec. 10, 2013

(54) FIELD OF PROGRAMME DELIVERY

(75) Inventor: Bertrand Wendling, Viroflay (FR)

(73) Assignee: THOMSON Licensing S.A., Boulogne-Billancourt (FR)

( * ) Notice: Subject to any disclaimer, the term of this patent is extended or adjusted under 35 U.S.C. 154(b) by 152 days.

(21) Appl. No.: 13/346,116

(22) Filed: Jan. 9, 2012

(65) Prior Publication Data

US 2012/0124621 A1 May 17, 2012

Related U.S. Application Data

(63) Continuation of application No. 10/480,694, filed as application No. PCT/IB02/03232 on Jun. 11, 2002, now abandoned.

(30) Foreign Application Priority Data

| Jun. 11, 2001 | (EP) | 01401512 |
|---|---|---|
| Jul. 23, 2001 | (EP) | 01306315 |
| Aug. 21, 2001 | (EP) | 01402202 |
| Oct. 31, 2001 | (EP) | 01309218 |

(51) Int. Cl.
*H04N 7/10* (2006.01)

(52) U.S. Cl.
USPC .......................................... 725/32

(58) Field of Classification Search
USPC .......................................... 725/32
See application file for complete search history.

(56) References Cited

U.S. PATENT DOCUMENTS

| 6,008,802 | A | * | 12/1999 | Iki et al. ..................... 715/721 |
|---|---|---|---|---|
| 6,188,398 | B1 | | 2/2001 | Collins-Rector et al. |
| 6,698,020 | B1 | * | 2/2004 | Zigmond et al. ............... 725/34 |
| 6,988,277 | B2 | * | 1/2006 | Kovac et al. ................... 725/34 |
| 7,079,176 | B1 | * | 7/2006 | Freeman et al. ............ 348/207.1 |
| 7,146,627 | B1 | * | 12/2006 | Ismail et al. ................... 725/47 |
| 7,272,842 | B2 | * | 9/2007 | Kay et al. ........................ 725/1 |
| 7,434,247 | B2 | * | 10/2008 | Dudkiewicz et al. .......... 725/46 |
| 7,552,458 | B1 | * | 6/2009 | Finseth et al. ................. 725/34 |
| 2002/0067730 | A1 | | 6/2002 | Hinderks et al. |
| 2005/0210502 | A1 | * | 9/2005 | Flickinger et al. ............. 725/34 |

FOREIGN PATENT DOCUMENTS

| EP | 1021036 A2 | 7/2000 |
|---|---|---|
| GB | 2343076 A | 4/2000 |
| WO | 99/11065 A1 | 3/1999 |
| WO | 0176249 A1 | 10/2001 |

* cited by examiner

*Primary Examiner* — Brian Pendleton
*Assistant Examiner* — Olugbenga Idowu
(74) *Attorney, Agent, or Firm* — Osha Liang LLP

(57) ABSTRACT

A receiver is disclosed, comprising means for receiving a program stream, and means for replacing portions of the program stream with a locally stored program. Other aspects of the invention are also presented.

6 Claims, 15 Drawing Sheets

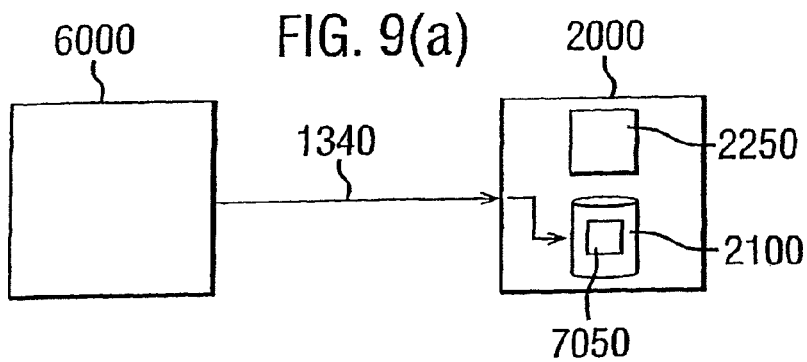
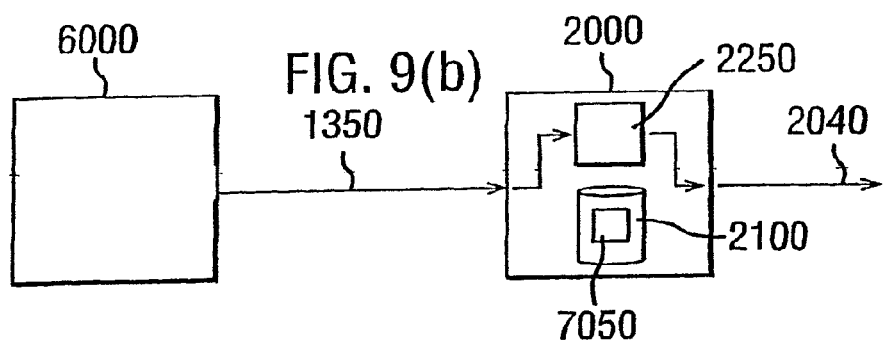
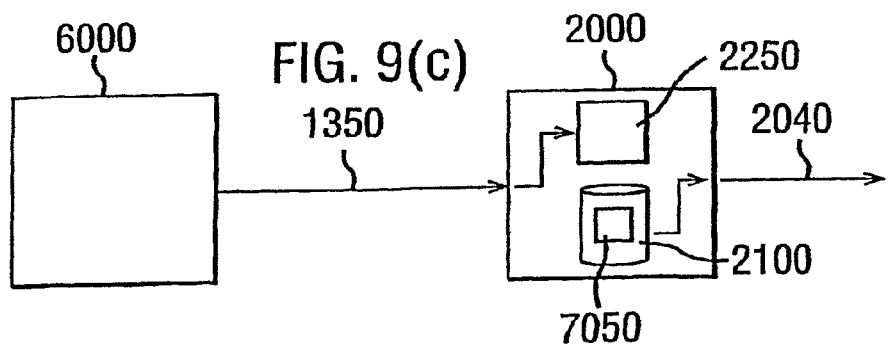
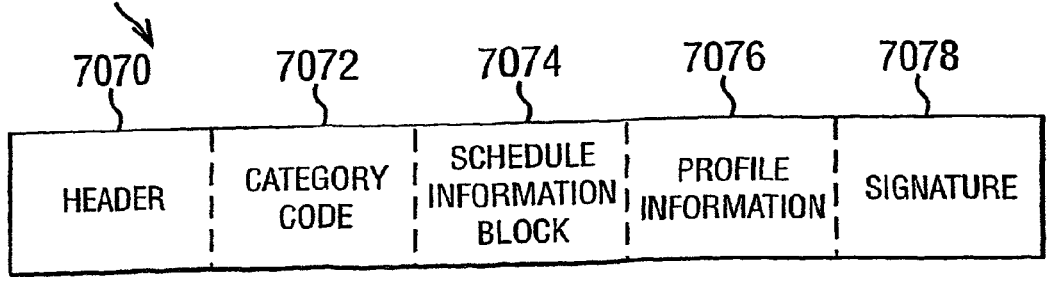

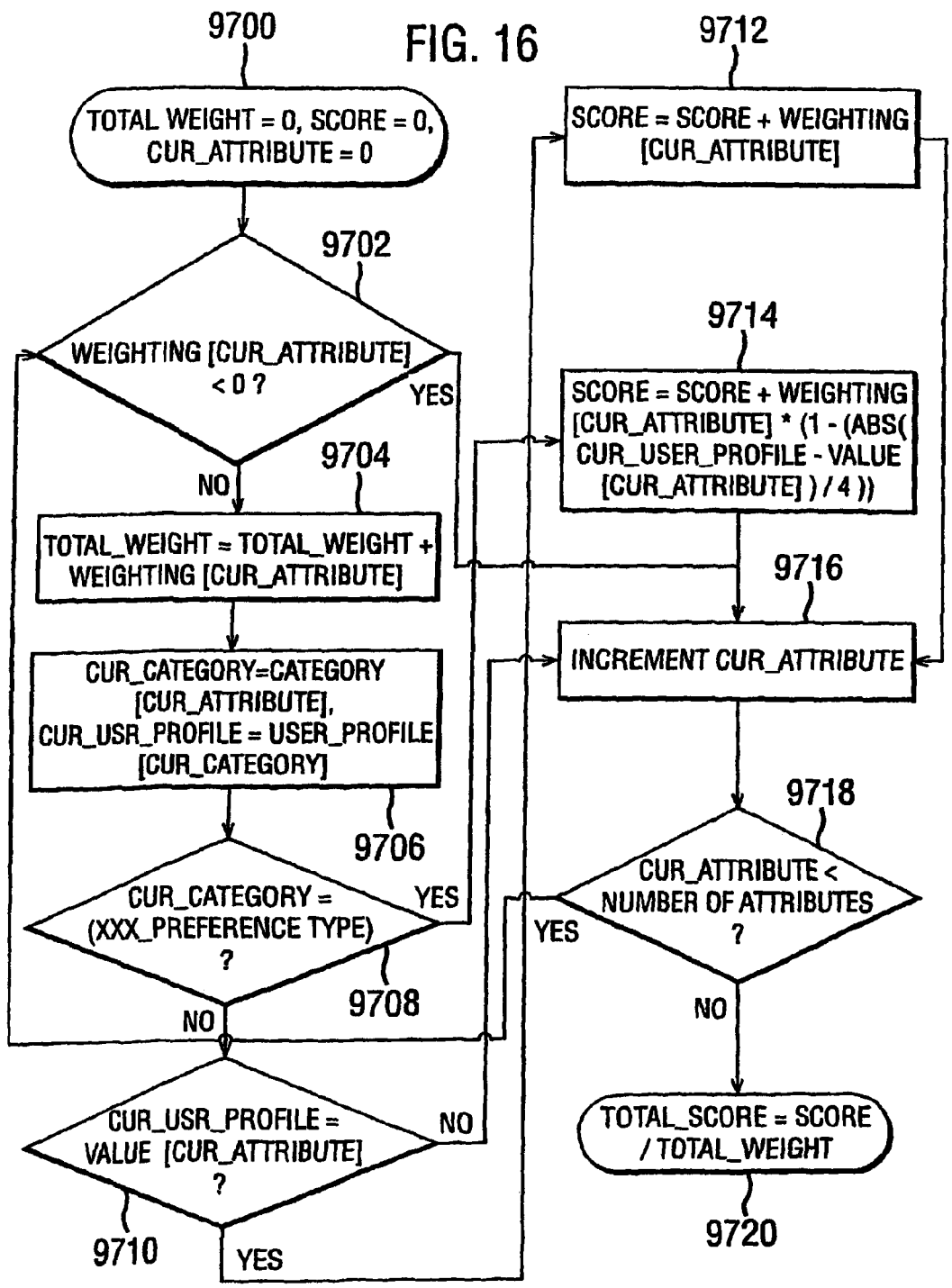

FIELD OF PROGRAMME DELIVERY

This application is a continuation application of U.S. patent application Ser. No. 10/480,694 filed Dec. 11, 2003, which is a national stage application of PCT/IB02/03232 filed Jun. 11, 2002, which claims priority to EP 0140152.7 filed Jun. 11, 2001; EP 01306315.1 filed Jul. 23, 2001; EP 01402202.4 filed Aug. 21, 2001; and EP 01309218.4 filed Oct. 31, 2001.

The present invention provides a receiver/decoder, apparatus for managing programmes, a method of managing a programme stream, a method of managing programmes, a method of controlling a receiver/decoder, a broadcast system, a message, an MPEG private table, a computer program product, a computer readable medium, and a signal. It finds particular application in the broadcast and display of personalised advertisements, and in the creation of "virtual" television channels.

Digital television systems transmit television channels to the viewer in digital, rather than analogue, form. The digital channels are encoded into a digital data stream at the transmitter end, and are decoded at the receiver end using a digital receiver/decoder. To allow interactivity, an uplink may be provided, either via the same medium that delivers the television channels, or else via a different medium such as a telephone link. Further types of data, such as digital audio, software and interactive data can be or are also broadcast. As used herein, the term "digital television system" includes for example any satellite, terrestrial, cable and other system.

The term "receiver/decoder" as used herein may connote a receiver for receiving either encoded or non-encoded signals, for example television and/or radio signals, preferably in MPEG format, which may be broadcast or transmitted by some other means. The term may also connote a decoder for decoding received signals. Embodiments of such receiver/decoders may include a decoder integral with the receiver for decoding the received signals, for example, in a "set-top box", such as a decoder functioning in combination with a physically separate receiver, or such a decoder including additional functions, such as a web browser, a video recorder, or a television.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4, and the MPEG-4 and other contemplated MPEG standards. In the context of the present patent application, the term includes all variants, modifications or developments of MPEG formats applicable to the field of digital data transmission.

Digital television systems are often characterised by having a large number (typically hundreds) of primarily audiovisual channels, which a user can browse between and display at will (subject to the relevant access rights being obtained for each channel). The range of material which can be viewed at any one time is therefore substantial, and can allow the user to customise to a certain extent his or her viewing. The task of keeping track of all of the available material, accurately classifying the material according to taste, and scheduling programmes of interest is beyond the abilities or inclinations of most users, however.

Furthermore, broadcast advertisements, which for a broadcaster represent a substantial and often vital source of income, will typically only be of interest to a relatively small proportion of viewers. Targeting of advertisements is often difficult—if not impossible in most conventional digital television systems—and inefficient, however.

U.S. Pat. No. 5,848,397 describes a method of scheduling the presentation of advertisements to e-mail users. A server system has an advertisement distribution scheduler which targets advertisements to particular users based on demographic information stored in a database management system resident on the server system. The downloaded advertisements are stored at a client system in an advertisement queue. The position of the advertisement in the queue is determined by a priority which has been previously assigned to the advertisement by the server system. The advertisements in the queue are then sequentially presented to the user.

In the system of U.S. Pat. No. 5,848,397, it is necessary to acquire the demographic information and store it centrally at the server system. This is done by requiring the user to complete a survey, or member profile, when first accessing the client system.

In order to target the advertisements to selected users, the server system in U.S. Pat. No. 5,848,397 transmits only selected advertisements to each client system, using a 'point-to-point' transmission protocol.

An alternative information and advertising distribution system and method is described in U.S. Pat. No. 5,740,549. In a preferred embodiment, a local area network (LAN) server downloads all news items into its local database. A number of subscribers are connected to the LAN server, each subscriber having its own user profile. Screen saver procedures are run by each subscriber. The screen saver procedures filter out news items in the LAN server's local information database that are not consistent with each subscriber's user profile, thereby showing each subscriber only the subset of news items corresponding to the subscriber's user profile. In the computers of stand alone subscribers, the filtering of news stories is handled during the data download process, by only downloading news items corresponding to the subscriber's user profile.

The present invention seeks to remedy problems encountered with the above prior art.

Accordingly, in a first, aspect of the invention there is provided a receiver/decoder for receiving and decoding a programme stream, comprising means (such as a mass storage device) for storing a plurality of programmes, means (such as a processor and associated memory) for selecting one of the stored programmes in accordance with a user profile, and means (such as the same or a further processor and associated memory and/or output) for replacing portions of the programme stream with the selected programme.

This can overall provide greater flexibility, and in particular provides greater efficiency by selecting a programme using a user profile only when required (such calculations can be quite complex). Additionally, since the plurality of programmes may be stored indiscriminately, relevant programmes can still be selected even if the user profile changes after the plurality of programmes is stored.

The term "programme" as used herein preferably connotes audio/visual or other content as is typically broadcast to a receiver/decoder. A news report, a film, an advertisement, a string of subtitles, a webcast, webcam, and a radio broadcast are examples of programmes within this sense. The term "audio/visual" as used herein preferably connotes either audio or visual matter, or a combination of the two. In the context of a broadcast signal received by a receiver/decoder, the term may encompass subtitle, teletext, synchronisation and other data transmitted in close relation to audio and video components making up a television programme.

Preferably the receiver/decoder further comprises means (such as a receiver) for receiving the plurality of programmes from a single communications channel, more preferably the communications channel being the same channel as that carrying the programme stream. The communications channel can be a conventional multimedia delivery system, such as a cable, satellite or terrestrial television system, but could also be an internet or any other network connection capable of conveying digital (or even analogue) data. This can allow the receiver/decoder to be more simply constructed.

Equally, the plurality of programmes may of course be received on different channels, either with respect to each other or with respect to the programme stream. In this case, the plurality of programmes may be received simultaneously, again with respect to each other or with respect to the programme stream.

The receiver/decoder may further comprise means (such as the same or a further receiver) for receiving the plurality of programmes at regular scheduled intervals, by which the reliability of the system can be improved. In particular, an event module (such as a processor and associated memory) may be provided to ensure receipt of the plurality of programmes.

Moreover, the receiver/decoder preferably further comprises means (such as a processor and associated memory) for maintaining a user profile, means (such as a processor and associated memory) for selecting a programme in accordance with the user profile, and means (such as an output) for outputting the programme, the means for selecting a programme being adapted to operate in response to a request to output the programme. The request may take the form of an 'external' request, such as the user pressing a button on a remote control to change channels, for example, or it may be an 'internal' request, such as communication between devices within the receiver/decoder. The request may further constitute an event, such as the execution of a particular section of computer code, indicating that a further programme selection is required. This can further improve the efficiency of the system, with the benefit again that a selection based on a user profile is only made when required. By contrast, a system where an entire programme schedule is mapped out and then adhered to can lack flexibility, should, for example, the user profile change during the course of the schedule. Notwithstanding, the present invention can be applied to create schedules of a plurality of programmes.

This important feature is also provided independently. Accordingly, in a further aspect of the invention, there is provided a receiver/decoder, comprising means (such as a processor and associated memory) for maintaining a user profile, means (such as a processor and associated memory) for selecting a programme in accordance with the user profile, and means (such as an output) for outputting the programme, the means for selecting being adapted to operate in response to a request to output the programme.

The means for selecting a programme may be adapted to select a further programme to follow the first programme, and may be further adapted to select the further programme during the outputting of the first programme. This can provide more responsive user profiling, should the user profile change rapidly over time; for example. By selecting programmes in this way, the need to maintain a 'play-list' of scheduled programmes can be avoided.

In a related aspect of the invention, there is provided a method of managing a programme stream at a receiver/decoder, comprising Sidling a plurality of programmes, selecting one of the stored programmes in accordance with a user profile, and replacing portions of the programme stream with the selected programme. The method preferably further comprises sending the plurality of programmes to the receiver/decoder via a single communications channel.

The method may further comprise sending the plurality of programmes at regular scheduled intervals, and more preferably further comprises sending the plurality of programmes via a television broadcast system at a time when fewer television channels are broadcast. Such a time could be, for example, between 2 a.m. and 4 a.m., or between 3 a.m. and 5 a.m., when less bandwidth is required by scheduled services.

The method preferably further comprises maintaining a user profile, selecting a programme in accordance with the user profile, and outputting the programme, the step of selecting a programme being taken in response to a request to output the programme.

In a further related aspect of the invention, there is provided a method of controlling a receiver/decoder, comprising maintaining a user profile, selecting a programme in accordance with the user profile, and outputting the programme, the step of selecting being taken in response to a request to output the programme. The method preferably further comprises selecting during the outputting of the programme a further programme to follow the programme.

In another related aspect of the invention, there is provided a computer program product (in this case and in subsequent cases typically in the form of one or more software modules) for receiving and decoding a programme stream, comprising means for storing a plurality of programmes, means for selecting one of the stored programmes in accordance with a user profile, and means for replacing portions of the programme stream with the selected programme. The computer program product preferably further comprises means for receiving the plurality of programmes from a single communications channel, and more preferably further comprises means for receiving the plurality of programmes at regular scheduled intervals.

The computer program product may further comprise means for maintaining a user profile, means for selecting a programme in accordance with the user profile, and means for outputting the programme, the means for selecting a programme being adapted to operate in response to a request to output the programme.

In a further related aspect of the invention, there is provided a computer program product, comprising means for maintaining a user profile, means for selecting a programme in accordance with the user profile, and means for outputting the programme, the means for selecting being adapted to operate in response to a request to output the programme. The means for selecting a programme may be adapted to select a further programme to follow the first programme, and may be further adapted to select the further programme during the outputting of the first programme.

In a further aspect of the invention there is provided a receiver/decoder comprising means (such as a receiver) for receiving a programme stream, and means (such as a processor and associated memory and/or a switch) for replacing portions of the programme stream with a locally stored programme.

By replacing portions of the programme stream with a locally stored programming, customised programming can be provided by the receiver/decoder itself.

The receiver/decoder preferably further comprises means (such as a receiver) for receiving a plurality of programmes suitable for a range of users, and means (such as a processor and associated memory) for selecting from the plurality of programmes at least one programme suitable for at least one of the users. The or each user is preferably associated with the receiver/decoder.

By selecting from a plurality of programmes, further customization can be provided. Since storage of the programme is not required before it is output, this important feature is also provided independently.

Consequently, in a related aspect there is provided a receiver/decoder comprising means (such as a receiver) for receiving a plurality of programmes suitable for a range of users, and means (such as a processor and associated memory) for selecting from the plurality of programmes at least one programme suitable for at least one of the users. As before, the or each user is preferably associated with the receiver/decoder.

The or each programme may be an advertisement. By dealing with advertisements, essentially the shortest type of programme, the manipulation of the programme can be simplified, since—amongst other things—relatively little capacity (bandwidth or storage) can be required to handle the advertisements. Moreover, the targeted nature of advertisements means that the selection process is relatively important.

The receiver/decoder may further comprise means (such as a mass storage device) for storing the plurality of programmes. By storing the plurality of programmes, customised content can be created at a variety of times, and not just when the plurality of programmes is broadcast or otherwise transmitted to the receiver/decoder.

Preferably the receiver/decoder further comprises means (such as an output) for outputting the or each programme. Such means could for example be an MPEG decoder, graphics engine, television modulator, and/or physical connection. Thus the stand-alone customization capability of the receiver/decoder can be enhanced.

The receiver/decoder may comprise means (such as a processor and associated memory) for removing from storage at least one of the stored plurality of programmes which was not selected for output.

The or each programme may be removed after a particular time limit has expired, if they fall below a certain 'desirability' criteria, if new programmes arrive, or a combination of the above, for example.

This can free up valuable storage space within the receiver/decoder and allow the or each programme to be replaced by possibly newer and more appropriate programmes as needed. Typically, 50 programmes are kept in storage at any one time, with the least desirable programmes being replaced first by any new programmes. Upwards of 100, 200, 500 or 1000 programmes may alternatively be stored.

The receiver/decoder may comprise means (such as a decoder) for extracting the plurality of programmes from a broadcast bit stream. Equally, the plurality of programmes may be received by other means, such as via an internet connection and/or broadband cable connection, for example. This can simplify the provision of customised content to a plurality of receiver/decoders, since the need can be eliminated for point-to-point transfers of the customised content to receiver/decoders.

In one embodiment the receiver/decoder is further adapted to receive the plurality of Programmes during a first transmission slot, and output the programme during a second transmission slot.

The first transmission slot preferably occurs at a scheduled time. Such a scheduled time might be, for example, between the hours of 2 and 4 in the morning. This can allow the plurality of programmes to be broadcast to the receiver/decoder at a time when 'spare' (or at least cheap) bandwidth is available for the purpose.

The second transmission slot may be a programme break during a broadcast channel. It may alternatively be the equivalent of a scheduled programme, such a regular half-hour slot or extended film slot. The term "programme break" as used herein preferably connotes any pause between scheduled programmes on a given television channel, such as an advertisement break, for example.

The first transmission slot and the second transmission slot may be concurrent, effectively corresponding to a 'live' broadcast situation, where the receiver/decoder presents a live 'virtual channel' to the user. This can require relatively fast processing to select programmes, but can obviate the need to store the plurality of programmes.

Preferably the receiver/decoder further comprises means (such as a receiver) for receiving a message indicating that a programme must be selected for the second transmission slot, and preferably also comprises means (such as a processor and associated memory) for processing the message.

The message may be received in the broadcast programme stream and preferably comprises timing information relating to the second transmission slot. This affords the advantage that the customization process can be controlled remotely from, for example, a broadcast centre, by use of messages sent to the receiver/decoder.

Moreover, the message preferably comprises a desired programme genre or type. Such a genre or type might be a programme category, such as news, sport or film, or within a given category, a specific genre, such as a horror film, or advertisements relating to health and fitness. Other messages specifying, for example, the types of advertisement which are to be selected, may be sent in relation to specific programme channels and/or in relation to particular time or date ranges, rather than applying to a specific time slot. By having the message comprise the indication that a programme must be selected for a given timeslot as well as specifying the desired programme genre or type, the transfer of data from an outside entity such as a broadcast centre to the receiver/decoder can be made more efficient.

The receiver/decoder preferably comprises means (such as a processor and associated memory) for maintaining a user profile, which can improve the customization of programmes to the user's taste. The profile is preferably associated with a user of the receiver/decoder. Alternatively, the profile may be associated with the owner of a subscription or other smartcard in the receiver/decoder.

The receiver/decoder preferably further comprises means (such as a receiver) for receiving control data associated with each of the plurality of programmes. The receiver/decoder is preferably adapted to receive the control data at substantially the same time as the plurality of programmes. Moreover, the control data associated with each individual programme is preferably interleaved between each respective programme, and is preferably in the form of a single data block comprising the individual programme and related control data, which can require less storage in the receiver/decoder for such data in general. Alternatively, all of the control data may be received at once in a single block, and may be descriptive of the plurality of programmes in general, rather than corresponding one-to-one with individual programmes.

The receiver/decoder is preferably further adapted to select the programme in accordance with the received control data, thus improving the controllability of the customization process from outside the receiver/decoder.

Preferably the control data comprises profile data, and the receiver/decoder further comprises means (such as a processor and associated memory) for selecting a programme whose associated profile data closely matches a or the user profile. This can reduce the number of programmes displayed in which the user will have no interest, and can thus increase the efficiency of the system.

The receiver/decoder may comprise means (such as a processor and associated memory) for adjusting at least part of the user profile, preferably in the form of a configuration application. The user may specify his relative preference for a number of specific interests, such as sport, for example. This can allow the user to improve the targeting of programmes, such as advertisements, to his or her individual taste.

Preferably the receiver/decoder is further adapted to select the programme in accordance with a desired programme genre or type. Alternatively the programme may be selected in accordance with characteristics of the user and/or receiver/decoder. Such parameters could be the user's subscription group or geographical location, for example.

The receiver/decoder may comprise means (such as a receiver) for receiving a second plurality of programmes, and means (such as a processor and associated memory) for selecting from the second plurality of programmes a second programme. Preferably the receiver/decoder also comprises means (such as an output) for outputting the second programme and/or means (such as the same or a further processor and associated memory) for scheduling the first or second selected programme for a transmission slot. This can enable the operation of a 'virtual channel'.

Preferably the receiver/decoder also comprises means (such as a receiver) for receiving control data associated with the second plurality of programmes, the second programme again preferably being selected in accordance with the associated control data.

The receiver/decoder may be adapted to selected the second programme at or after the end of the first programme. As mentioned above, this can help to implement flexible systems where the selection of programmes is computed 'on the fly', allowing live 'virtual channels' which do not require local storage to function.

Preferably the receiver/decoder further comprises means for computing a compatibility rating in respect of the first programme for the second plurality of programmes using programme sequence rules, and is further adapted to select a programme having a high compatibility rating. This can allow yet more powerful customization, for example keeping track of the history of programmes which have been output, and adapting the output accordingly.

This important feature is also provided independently. Accordingly, in a related aspect of the invention, there is provided a receiver/decoder comprising means (such as a processor and associated memory) for selecting a first programme from a first plurality of programmes, and means (such as the same or a further processor and associated memory) for selecting a second programme from a second plurality of programmes in accordance with programme sequence rules applied in respect of the first programme.

The programme sequence rules may place limitations on the number of repetitions of a particular type or genre of programme within a specified time limit. The rules could thus prevent advertisements for rival makes of car being presented to the user in close succession, for example. Alternatively, the rules could specify that a minimum number of advertisements or news reports need to be presented within a given time frame, for example.

The programme sequence rules may also specify preferred combinations and/or sequences of types or genres of programmes. Thus, one can have sequence rules specifying that advertisements should fall before and after films, for example.

Preferably, the receiver/decoder further comprises means (such as a receiver) for receiving at the receiver/decoder a message comprising at least part of the programme sequence rules. This can provide a more accessible way to customise the presentation of 'virtual channels' to the user without requiring any data from the receiver/decoder. Preferably the receiver/decoder is adapted to receive the message as part of a broadcast bit stream, but it may also be adapted to receive the message by other means, such as a point-to-point connection over the internet, for example.

The receiver/decoder may comprise means (such as a processor and associated memory) for replacing at least part of the programme sequence rules with received new programme sequence rules. This can allow the customization to be managed in a dynamic and updateable fashion, again without requiring input from the receiver/decoder in the process. This is particularly important in certain jurisdictions where privacy laws prevent most if not all forms of unsolicited data transfer from the receiver/decoder to other parties.

The means for receiving a message may be adapted to decode an MPEG private table comprising the message. Such an MPEG private table might be an Action Notification Table (ANT) as described later, or a Virtual Channel Management Table (VCMT) also as described later. This can improve the efficiency of the system, as the MPEG private table was found to be an effective transport for the message.

In a related aspect of the invention, there is provided a receiver/decoder, comprising means (such as a receiver) for receiving a programme stream, and means (such as a processor and associated memory, and/or a switch) for replacing portions of the programme stream with a locally stored advertisement.

In a further aspect of the invention, there is provided apparatus for managing programmes comprising means (such as a processor and associated memory) for generating a message comprising programme sequence rules to be applied to programmes output by a receiver/decoder.

The apparatus preferably further comprising means (such as a transmitter) for sending the message to a receiver/decoder. This feature is also provided independently. The apparatus preferably further comprises means (such as a broadcast system connection) for broadcasting the message via a broadcast medium.

The means for generating a message is preferably adapted to include addressing information in the message, so that the message is only decoded by receiver/decoders having given characteristics. In addition, the means for generating a message may be adapted to generate an MPEG private table corresponding to the message.

In a further aspect of the invention, there is provided a method of managing a programme stream, comprising receiving a programme stream, and replacing portions of the programme stream with a locally stored programme.

The method preferably further comprises receiving a plurality of programmes suitable for a range of users, and selecting from the plurality of programmes at least one programme suitable for a user associated with the receiver/decoder.

In a further related aspect of the invention, there is provided a method of managing programmes, comprising receiving at the receiver/decoder a plurality of programmes suitable for a range of users, and selecting from the plurality of programmes at least one programme suitable for at least one of the users. The or each user is preferably associated with a receiver/decoder at which the output is generated. As before, the plurality of programmes may be advertisements.

The method may further comprise removing from storage at least one of the stored plurality of programmes which was not selected for output.

The plurality of programmes are preferably received during a first transmission slot, and the programme is preferably output during a second transmission slot.

The first transmission slot preferably occurs at a scheduled time, and the second transmission slot may be a programme break during a broadcast channel. The first transmission slot and the second transmission slot may also be concurrent.

The step of selecting a programme may further comprise receiving a message indicating that a programme must be selected for the second transmission slot, and selecting the programme accordingly. The message is preferably received in the broadcast programme stream and preferably comprises timing information relating to the second transmission slot. This affords the advantage that the customization process can be controlled remotely from, for example, a broadcast centre, by use of messages to the receiver/decoder.

The message preferably comprises a desired programme genre or type.

The method may further comprise receiving control data associated with each of the plurality of programmes, which can simplify the management of the customization of programmes.

The programme is preferably selected in accordance with the received control data; preferably, the control data comprises profile data, and the step of selecting a programme comprises comparing such profile data to a user profile associated with a user of the receiver/decoder, and selecting a programme whose associated profile data closely matches the user profile.

Preferably at least part of the user profile is adjustable by the user. The programme may be selected in accordance with a or the desired programme genre or type. Alternatively the programme may be selected in accordance with characteristics of the user and/or receiver/decoder.

The method may further comprise receiving a second plurality of programmes, selecting from the second plurality of programmes a second programme, and outputting the second programme. Preferably the method further comprises scheduling the first or second selected programme for a transmission slot.

Preferably the method also comprises receiving control data associated with the second plurality of programmes, the second programme again preferably being selected in accordance with the associated control data. The second programme may be selected at or after the end of the first programme.

The step of selecting a second programme preferably comprises computing a compatibility rating in respect of the first programme for the second plurality of programmes using programme sequence rules, and selecting a programme having a high compatibility rating.

This important feature is also provided independently. Accordingly, in a further aspect of the invention, there is provided a method of managing programmes, comprising selecting a first programme from a first plurality of programmes, and selecting a second programme from a second plurality of programmes in accordance with programme sequence rules applied in respect of the first programme.

The method preferably further comprises receiving at the receiver/decoder a message comprising at least part of the programme sequence rules. The method may further comprise replacing at least part of the programme sequence rules with received new programme sequence rules.

The method preferably further comprises sending to the receiver/decoder (in addition to receiving at the receiver/decoder) a message comprising programme sequence rules. This and other important features are also provided independently Accordingly, in a further aspect of the invention there is provided a method of controlling a receiver/decoder, comprising sending to the receiver/decoder a message comprising programme sequence rules to be applied to programmes output by the receiver/decoder.

The message is preferably broadcast via a broadcast medium. As noted above, this can provide a very simple way to manage the customization of content for a large number of receiver/decoders.

The message may comprise addressing information, so that the message is only decoded by receiver/decoders having given characteristics. This can further simplify and improve the management of the customization by targeting scheduling rule information to only a subset of the receiver/decoders which can receive the broadcast messages.

The method may further comprise sending to a receiver/decoder a message comprising timing information in respect of a transmission slot, and a command to display a customised programme during the transmission slot. The message may further comprise genre or type information relating to the programme. This feature may be provided independently.

The method may also comprise sending to a receiver/decoder control data associated with a programme, the control data comprising profile data, timing information and preferably also category information.

The method may further comprise receiving and storing a plurality of programmes during a first transmission slot, receiving and outputting a scheduled programme during a second transmission slot, selecting one of the stored programmes in accordance with a stored profile, and outputting the selected stored programme. This feature is also provided independently.

The method may further comprise selecting a first programme having control data which matches a stored user profile, receiving the selected first programme on a first channel during a first transmission slot, selecting a second programme having control data which matches a stored user profile, switching to the second channel, and receiving the selected second programme on the second channel during a second transmission slot, the switching step being performed during a synchronised programme break between the first and second transmission slots. This feature is also provided independently.

There is also provided a method of scheduling programmes, the method comprising the steps of receiving and storing two or more programmes; receiving at least one rule; and scheduling the stored programmes in accordance with a scheduling algorithm which incorporates the received rule(s).

The method may further comprise the steps of selecting a subset of a plurality of transmitted programmes in accordance with a stored profile; and storing only the selected subset of the transmitted programmes.

The invention also provides a method of modifying a scheduling algorithm, the scheduling algorithm being configured to compose a schedule which determines an order of presentation of programmes to a user, the scheduling algorithm being stored on a user end system, the method comprising the step of transmitting a rule to the user end system for incorporation into the scheduling algorithm.

The invention further provides a method of centrally controlling the scheduling algorithm performed by a user end system. Thus, new rules can be transmitted at any time to update the scheduling algorithm.

The invention also provides a method of transmitting programmes, the method comprising the steps of transmitting a first programme on a first channel during a first transmission slot; transmitting a second programme on a second channel during a second transmission slot; and transmitting control data associated with the first and second programmes, the first and second slots preferably being separated by a synchronised programme break. The control data associated with the second programme is preferably transmitted during the synchronised programme break.

The invention provides a method of switching between programmes during a programme break, or 'crosspoint' between the transmission slots. By synchronising the programme breaks, a seamless sequence of programmes can be presented to a user.

The invention also provides a method of controlling a virtual channel, the method comprising the steps of receiving and storing first, and second programmes; selecting and retrieving the stored first programme in accordance with a stored profile; and deleting or overwriting the unselected second programme.

Each programme is preferably simultaneously transmitted to two or more user end systems. Preferably at least one of the programmes comprises an advertisement. Each of the programmes preferably comprises a video and/or audio component.

In a further aspect of the invention there is provided a broadcast system, comprising a receiver/decoder as aforesaid, and apparatus also as aforesaid.

In another aspect of the invention, there is provided a message for transmission to a receiver/decoder, comprising an instruction to select a programme for a given transmission slot, and timing information regarding the transmission slot. The message preferably further comprises a desired programme genre or type.

In a yet further aspect of the invention, there is provided a message for transmission to a receiver/decoder, comprising programme sequence rules. This or the above message preferably further comprises addressing information.

There is also provided control data comprising profile data, timing information and preferably also category information.

In another aspect of the invention, there is provided an MPEG private table comprising a message as aforesaid.

In a further aspect of the invention, there is provided a computer program product adapted to perform a method as aforesaid.

In a related aspect of the invention, there is provided a computer program product adapted to modify a receiver/decoder to be capable of performing a method as aforesaid.

In another related aspect of the invention there is provided a computer program product comprising means (in this case and in subsequent cases typically in the form of one or more software modules) for selecting from a plurality of advertisements one advertisement suitable for a user associated with a receiver/decoder.

The computer program product preferably further comprises means for receiving and storing at the receiver/decoder a plurality of programmes suitable for a range of users, means for selecting from the stored plurality of programmes one programme suitable for a user associated with the receiver/decoder, and means for outputting the programme.

The plurality of programmes are preferably advertisements. The computer program product preferably further comprises means for removing from storage at least one of the stored plurality of programmes which was not selected for output.

The means for receiving and storing a plurality of programmes preferably comprises means for extracting the plurality of programmes from a broadcast bitstream. The plurality of programmes are preferably received during a first transmission slot, and the programme is output during a second transmission slot. The first transmission slot preferably occurs at a scheduled time. The second transmission slot is preferably a programme break during a broadcast channel. The first transmission slot and the second transmission slot are preferably concurrent.

The means for selecting a programme may further comprise means for receiving a message indicating that a programme must be selected for the second transmission slot, and means for selecting the programme accordingly. The message preferably comprises a desired programme genre or type. The computer program product preferably further comprises means for receiving control data associated with each of the plurality of programmes. The programme is preferably selected in accordance with the received control data. The control data preferably comprises profile data, and the means for selecting a programme preferably comprises means for comparing such profile data to a user profile associated with a user of the receiver/decoder, and means for selecting a programme whose associated profile data closely matches the user profile. At least part of the user profile is preferably adjustable by the user.

The programme is preferably selected in accordance with a or the desired programme genre or type. The programme may be selected in accordance with characteristics of the user and/or receiver/decoder. The computer program product may further comprise means for receiving a second plurality of programmes, means for selecting from the second plurality of programmes a second programme, and means for outputting the second programme. The second programme may be selected at or after the end of the first programme. The means for selecting a second programme preferably comprises means for computing a compatibility rating in respect of the first programme for the second plurality of programmes using programme sequence rules, and means for selecting a programme having a sufficiently high compatibility rating.

The invention also provides a computer program product comprising means for receiving a first plurality of programmes, means for selecting and outputting a first programme from the first plurality of programmes, means for receiving a second plurality of programmes, and means for selecting and outputting a second programme from the second plurality of programmes, the second programme being selected in accordance with programme sequence rules applied in respect of the first programme.

The programme sequence rules may place limitations on the number of repetitions of a particular type or genre of programme within a specified time limit. The programme sequence rules may also specify preferred combinations and/or sequences of types or genres of programmes. The computer program product may further comprise means for receiving at the receiver/decoder a message comprising at least part of the programme sequence rules. The computer program product may further comprise means for replacing at least part of the programme sequence rules with received new programme sequence rules.

There is also provided a computer program product comprising means for sending to the receiver/decoder a message comprising programme sequence rules. The message is preferably broadcast via a broadcast medium. The message may comprise addressing information, so that the message is only decoded by receiver/decoders having given characteristics.

In another aspect of the invention, there is provided a signal tangibly embodying a computer program product as aforesaid. Such a signal could be a set of internet packets, for example, or a collection of messages broadcast in a digital television system.

In a further aspect of the invention there is provided a computer readable medium tangibly embodying a computer program product as aforesaid. Such a computer readable medium could be a CD-ROM, for example.

The invention also provides a computer program and a computer program product for carrying out any of the methods described herein and/or for embodying any of the apparatus features described herein, and a computer program product having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Preferred features of the invention will now be described, by way of example, with reference to the accompanying drawings, in which.

Figure 11:
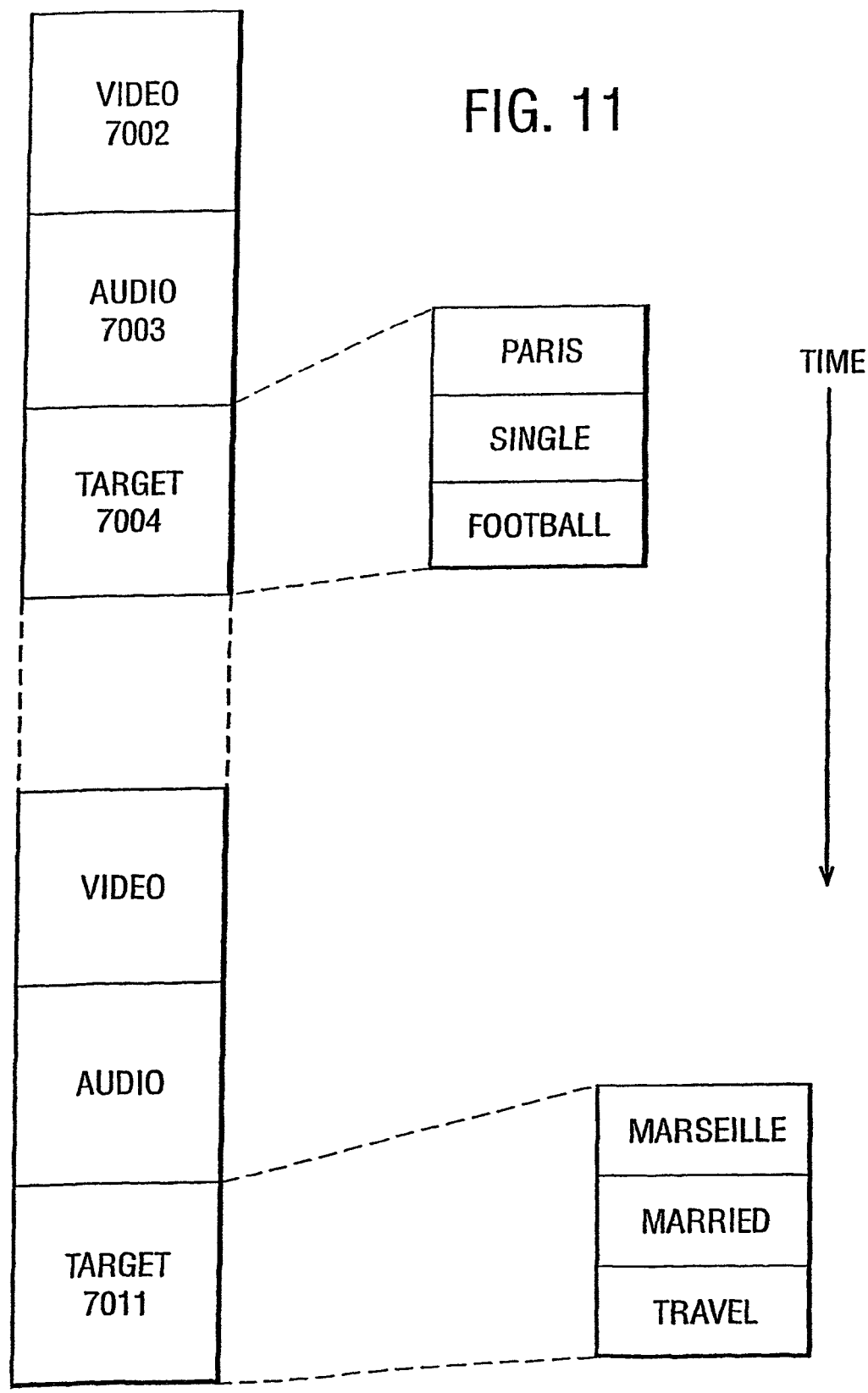
Figure 12:
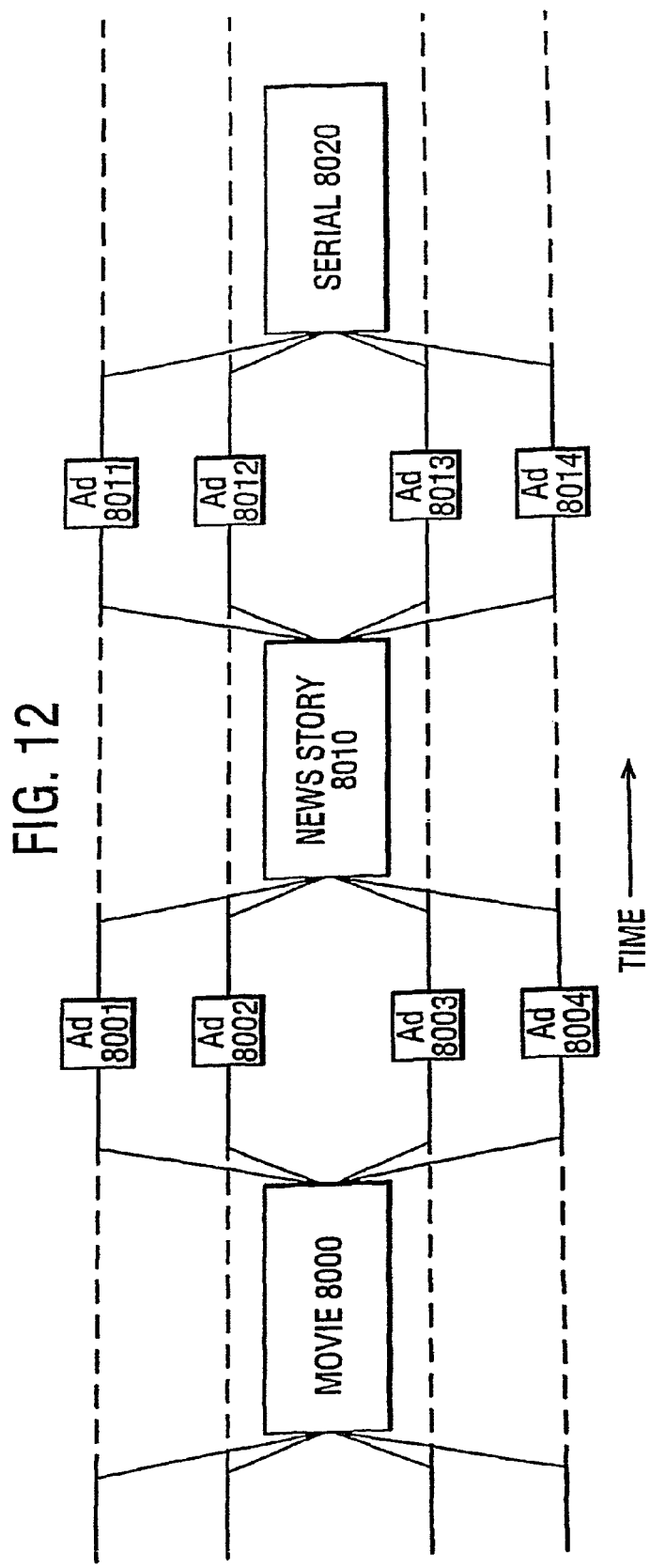
Figure 13:
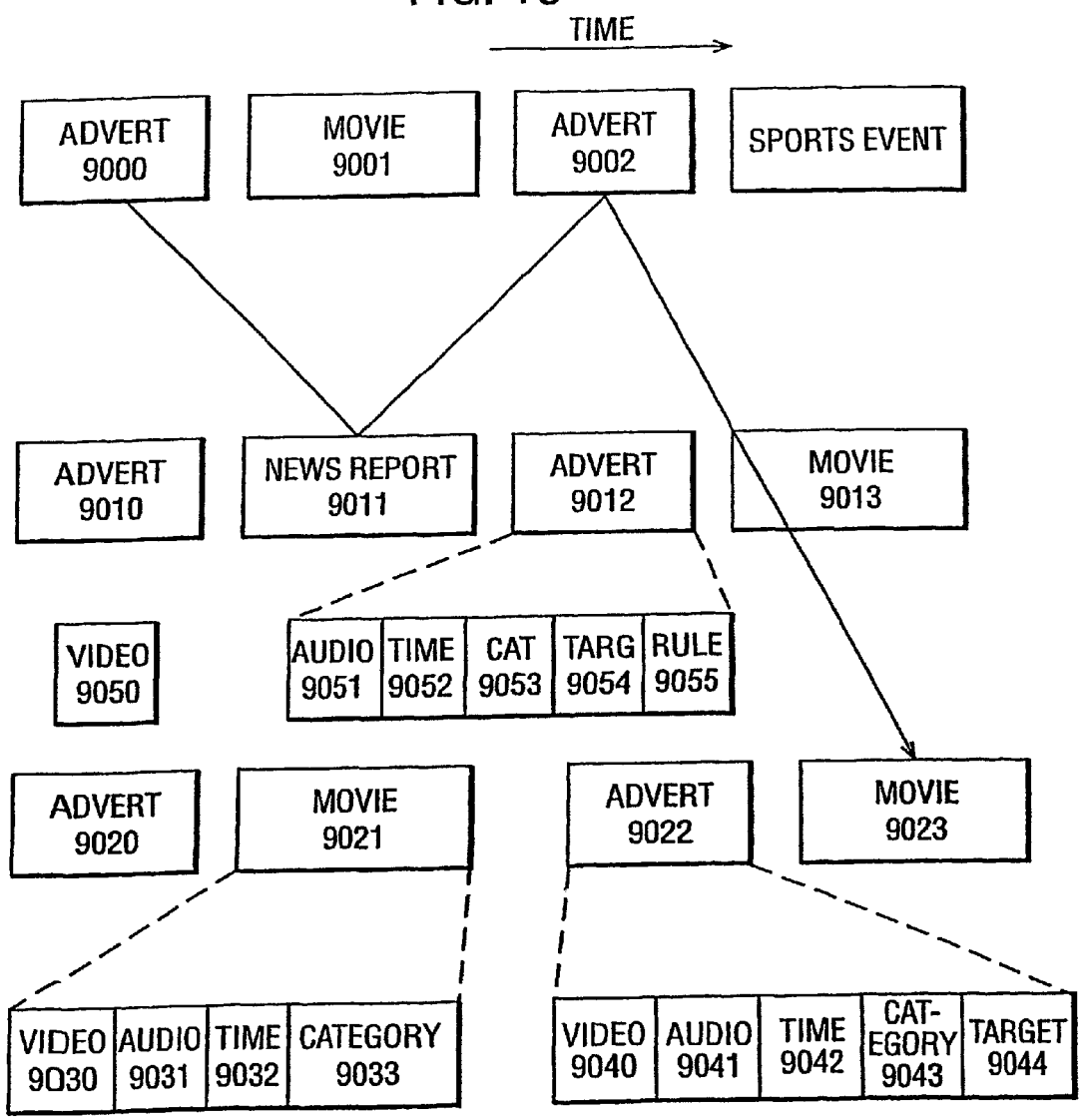
Figure 14:
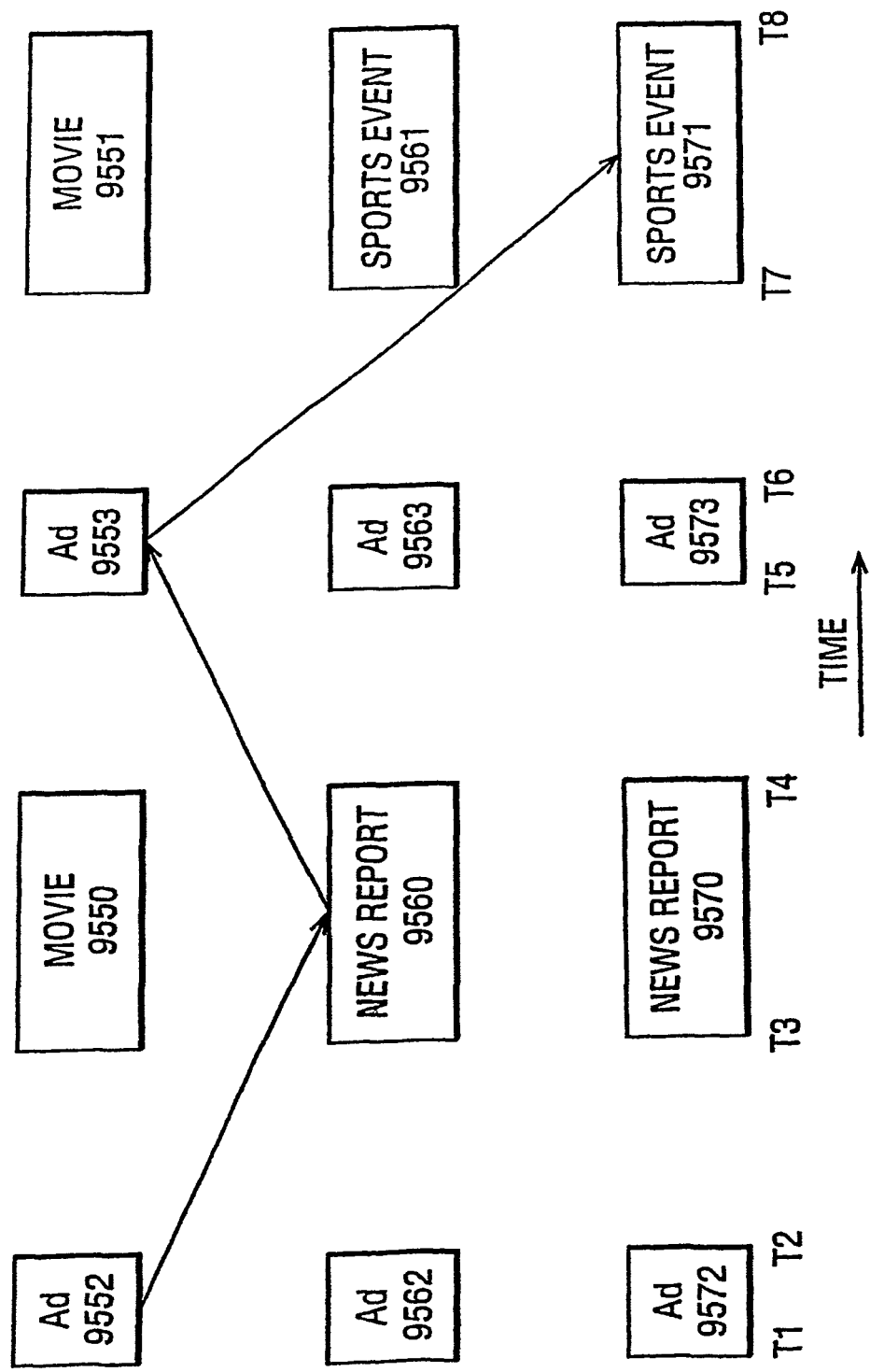
Figure 15:
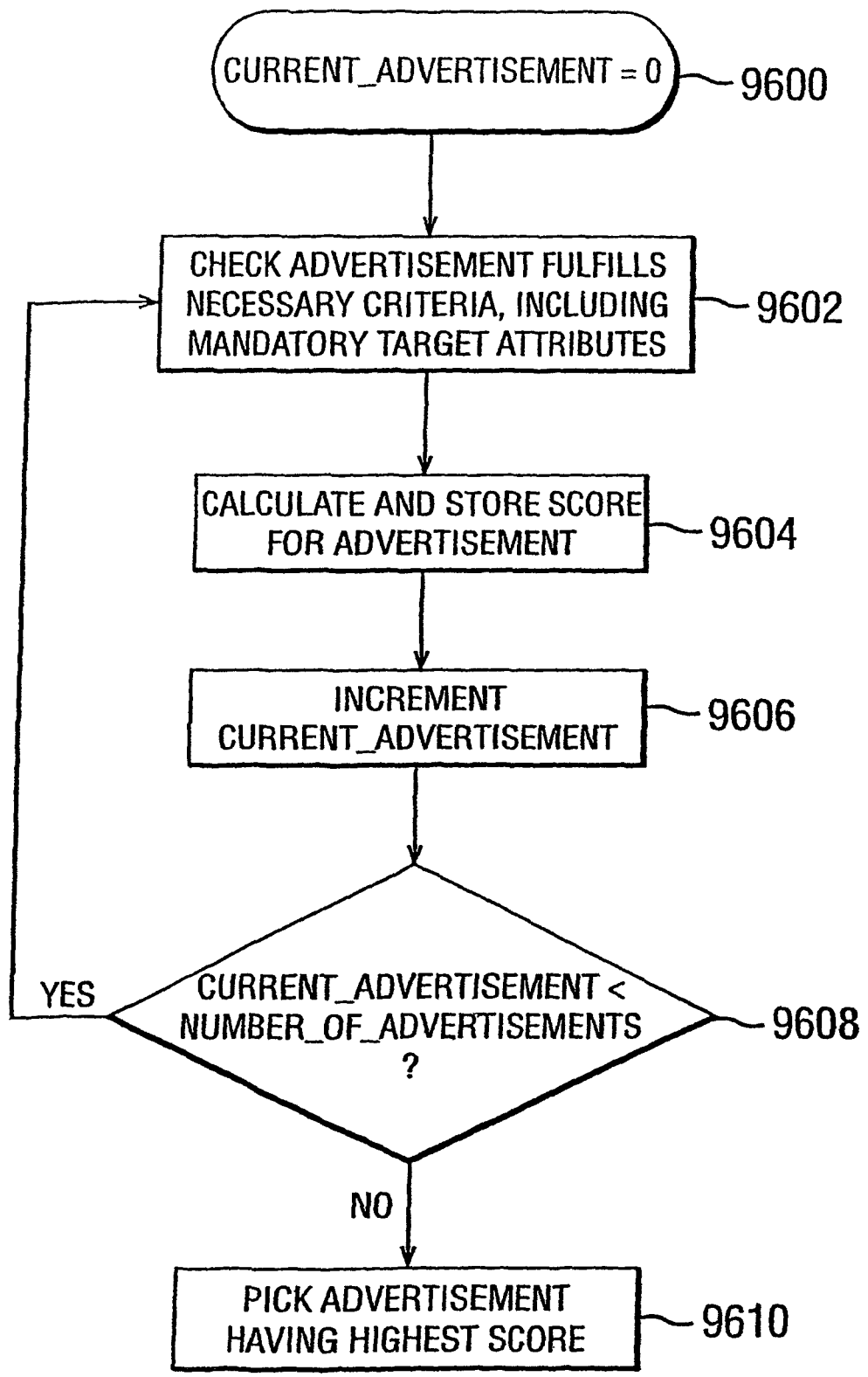

FIGS. 9(a), (b), and (c) are schematics, illustrating the operation of personalised advertisements;

FIG. 10 is a schematic of the structure of a Virtual Channel Information Message (VCIM);

FIG. 11 is a diagram illustrating the format of broadcast advertisements;

FIG. 12 is an example showing four virtual channels presented to four different users;

FIG. 13 is an example illustrating the selective recording of programmes being broadcast on three separate channels;

FIG. 14 is as schematic illustrating a virtual channel method which switches between channels at crosspoints;

FIG. 15 is a flow diagram illustrating a method of evaluating the suitability of advertisements, and FIG. 16 is a flow diagram illustrating in more detail a method of evaluating the suitability of advertisements.

SYSTEM OVERVIEW

Figure 1:
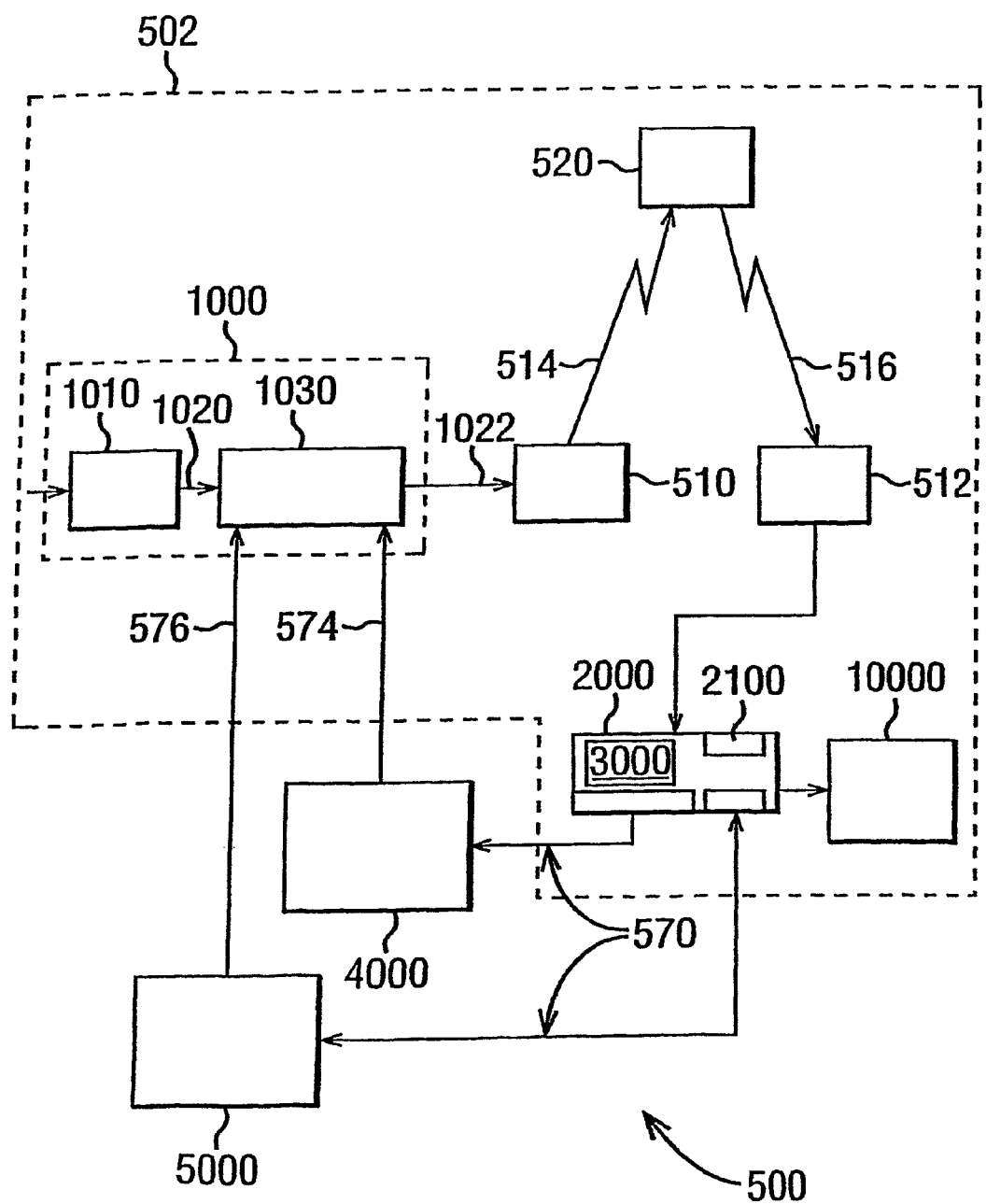
FIG. 1 is an overview of a satellite digital television system.

An overview of a digital television system 500 is shown in FIG. 1. As will be discussed below, the system 500 comprises a broadcast centre 1000, a receiver/decoder 2000, a software/hardware architecture 3000 of the receiver/decoder, an interactive system 4000, and a conditional access system 5000, as will all be discussed below.

The system 500 includes a mostly conventional digital television system 502 that uses the known MPEG-2 compression system to transmit compressed digital signals. In more detail, MPEG-2 compressor 1010 in a broadcast centre 1000 receives a digital signal stream (typically a stream of video signals). The compressor 1010 is connected by linkage 1020 to a multiplexer and scrambler 1030.

The multiplexer 1030 receives a plurality of further input signals, assembles the transport stream and transmits compressed digital signals to a transmitter 510 of the broadcast centre via linkage 1022, which can of course take a wide variety of forms including telecommunications links. The transmitter 510 transmits electromagnetic signals via uplink 514 towards a satellite transponder 520, where they are electronically processed and broadcast via notional downlink 516 to earth receiver 512, conventionally in the form of a dish owned or rented by the end user. Other transport channels for transmission of the data are of course possible, such as terrestrial broadcast, cable transmission, combined satellite/cable links, telephone networks etc.

The signals received by receiver 512 are transmitted to an integrated receiver/decoder 2000 owned or rented by the end user and connected to the end user's television set 10000. The receiver/decoder 2000 decodes the compressed MPEG-2 signal into a television signal for the television set 10000. Although a separate receiver/decoder is shown in FIG. 1, the receiver/decoder may also be part of an integrated digital television. As used herein, the term "receiver/decoder" includes a separate receiver/decoder, such as a set-top box, and a television having a receiver/decoder integrated therewith.

In the receiver/decoder 2000 a hard disk 2100 is provided, on which audiovisual and other data can be stored. This allows advanced recording and playback facilities for programmes received by the receiver/decoder, and also allows large amounts of other types of data, such as electronic programme guide data, to be stored in the receiver/decoder.

A content management and protection system (CMPS) 2300 (not shown) in the receiver/decoder provides the ability securely and flexibly to control the recording and playback of data on the hard disk 2100 (or other storage device).

In a multichannel system, the multiplexer 1030 handles audio and video information received from a number of parallel sources and interacts with the transmitter 510 to broadcast the information along a corresponding number of channels. In addition to audiovisual information, messages or applications or any other sort of digital data may be introduced in some or all of these channels interlaced with the transmitted digital audio and video information.

An interactive system 4000 is connected to the multiplexer 1030 and the receiver/decoder 2000, and is located partly in the broadcast centre and partly in the receiver/decoder. It enables the end user to interact with various applications via a back channel 570. The back channel may be, for example a Public Switched Telephone Network (PSTN) channel (for example, a modemmed back channel) or an Out of Band (OOB) channel.

A conditional access system 5000, also connected to the multiplexer 1030 and the receiver/decoder 2000 and again located partly in the broadcast centre and partly in the receiver/decoder, enables the end user to access digital television broadcasts from one or more broadcast suppliers. A smartcard, capable of deciphering messages relating to commercial offers (that is, one or several television programmes sold by the broadcast supplier), can be inserted into the receiver/decoder 2000. Using the receiver/decoder 2000 and smartcard, the end user may purchase commercial offers in either a subscription mode or a pay-per-view mode. Typically this is achieved using the back channel 570 which is used by the interactive system 4000.

As mentioned above, programmes transmitted by the system are scrambled at the multiplexer 1030, the conditions and encryption keys applied to a given transmission being determined by the access control system 5000. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the receiver/decoder 2000 having access to an equivalent to the exploitation key stored on a smartcard inserted in the receiver/decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission.

Figure 2:
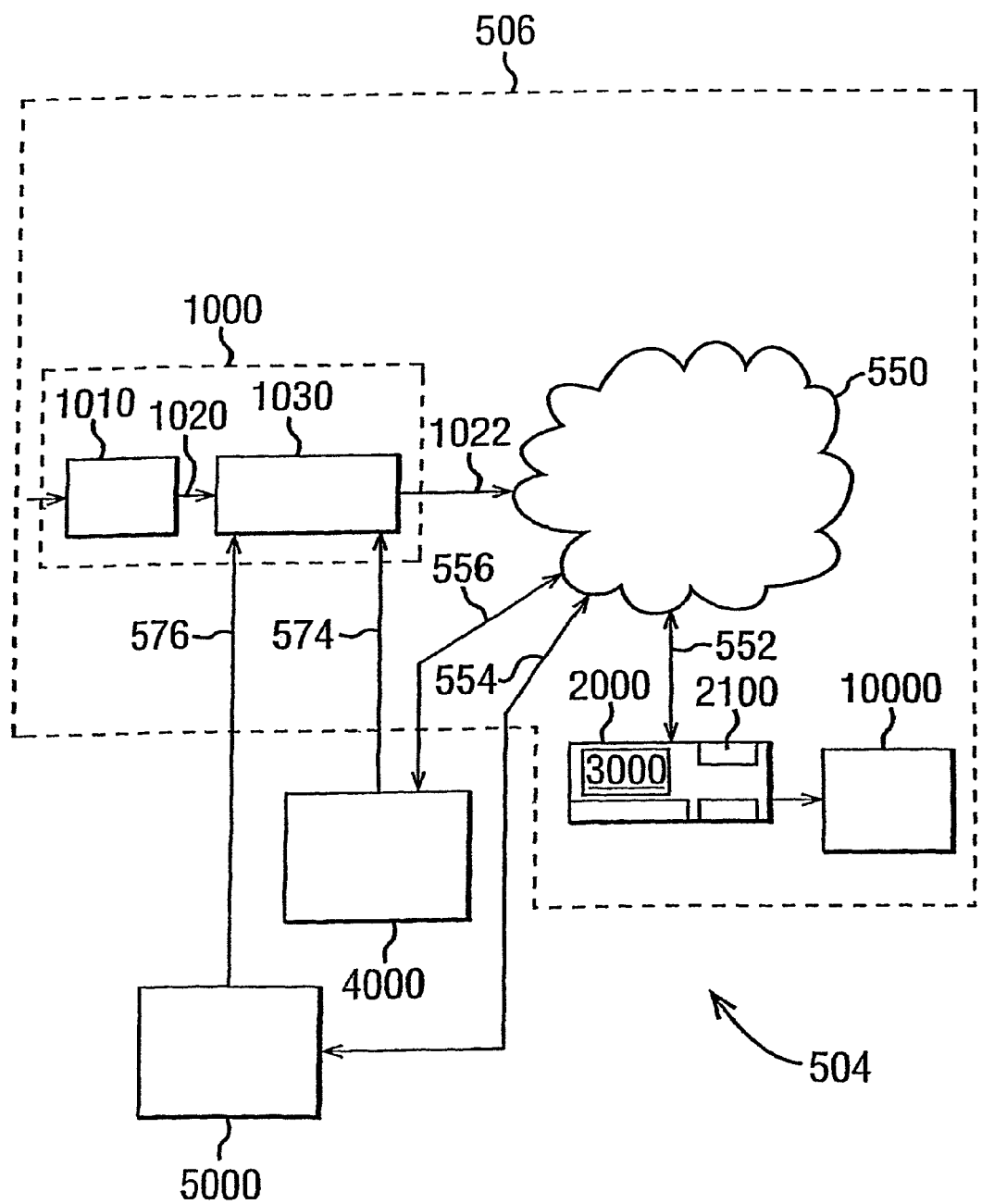
FIG. 2 is an overview of a cable digital television system.

FIG. 2 illustrates an alternative embodiment of a digital television system 504, utilising a cable network as the broadcast medium for the compressed digital signals. In this figure, like parts are indicated with like numerals.

The satellite transponder and transmitting and receiving stations are replaced by a cable network 550. Additionally, in this particular embodiment, the modemmed back channel between the receiver/decoder 2000 and the interactive system 4000 and conditional access system 5000 is removed, replaced by linkages 554, 556 between the cable network 550 and the conditional access system 5000 and interactive system 4000 respectively. The receiver/decoder 2000 thus communicates with the other systems via the cable network 550, utilising a cable modem or other means to allow it to send and receive data via the same link as it receives data from the broadcast centre.

The cable network 550 may be any form of wide area network (WAN), such as a dedicated connection, the internet, local cable distribution network, wireless connection, or any combination of the above. In the present embodiment, the hybrid fibre coax (IFC) network is used. It is appreciated that the various means of communication between the receiver/decoder 2000 and the other components of the television system are interchangeable.

Conditional Access System

Figure 3:
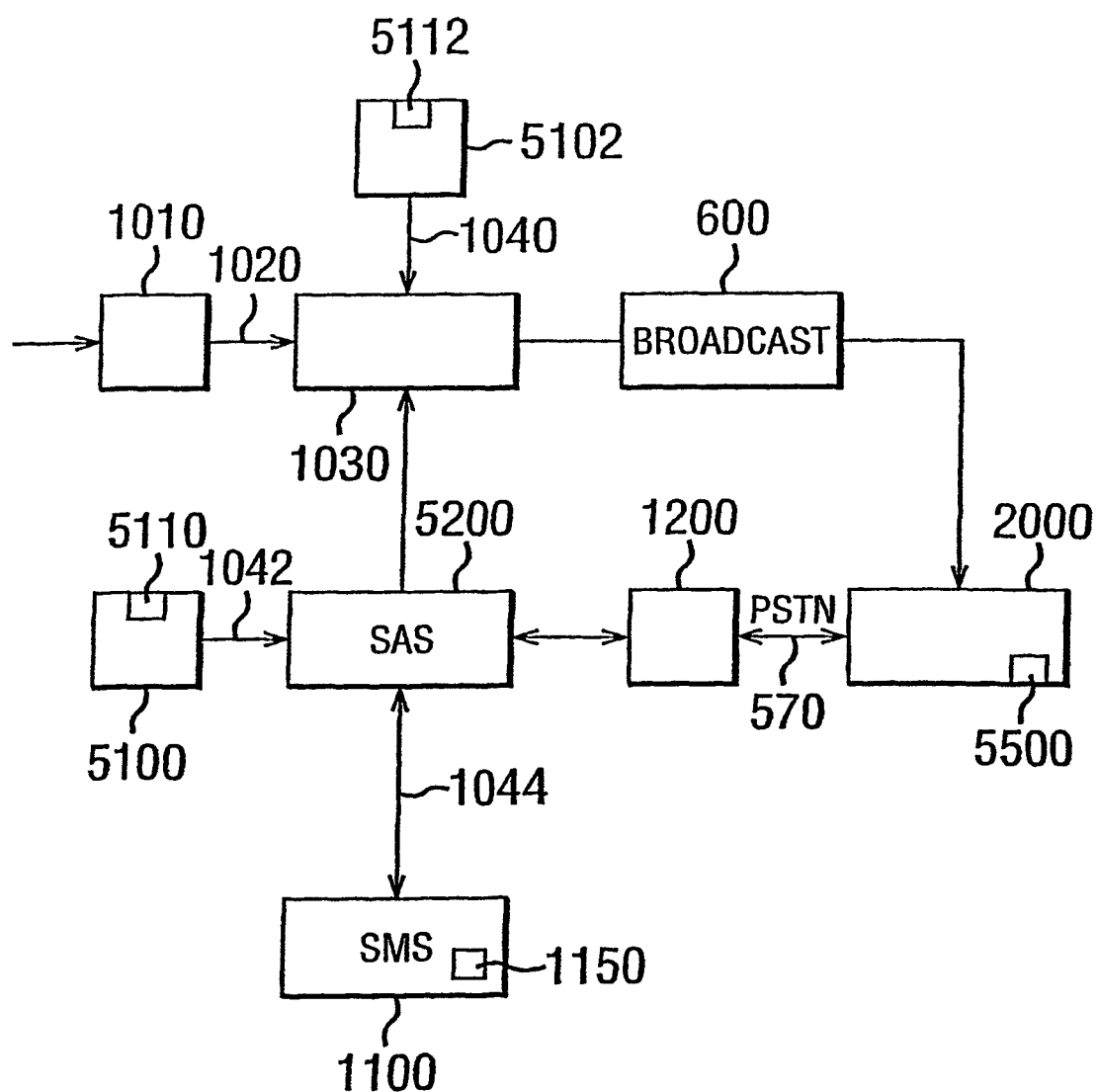
FIG. 3 is an overall system view, with the head-end shown in more detail.

With reference to FIG. 3, in overview the conditional access system 5000 includes a Subscriber Authorization System (SAS) 5200. The SAS 5200 is connected to one or more Subscriber Management Systems (SMS) 1100, one SMS for each broadcast supplier, by a link 1044, which may be a TCP-IP link or other type of link. Alternatively, one SMS could be shared between two commercial operators, or one operator could use two SMSs, and so on.

First encrypting units in the form of ciphering units 5100 utilising "mother" smartcards 5110 are connected to the SAS by linkage 1042. Second encrypting units again in the form of ciphering units 5102 utilising mother smartcards 5112 are connected to the multiplexer 1030 by linkage 1040. The receiver/decoder 2000 receives a "daughter" smartcard 5500. The receiver/decoder is connected directly to the SAS 5200 via communications servers 1200 and the modemmed back channel 570. The SAS sends amongst other things subscription rights to the daughter smartcard on request.

In variants of the preferred embodiment, internet or cable connections either complement or replace the PSTN 570 and communications servers 1200.

The smartcards contain confidential information from one or more commercial operators. The "mother" smartcard encrypts different kinds of messages and the "daughter" smartcards decrypt the messages, if they have the rights to do so.

With reference to FIG. 3, in the broadcast centre, the digital video signal is first compressed (or bit rate reduced), using the MPEG-2 compressor 1010. This compressed signal is then transmitted to the multiplexer and scrambler 1030 in order to be multiplexed with other data, such as other compressed data.

The scrambler generates a control word used in the scrambling process and included in the MPEG-2 stream in the multiplexer 1030. The control word is generated internally and enables the end user's integrated receiver/decoder 2000 to descramble the programme.

Access criteria, indicating how the programme is commercialized, are also added to the MPEG-2 stream. The programme may be commercialized in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the Pay Per View mode, the end user is provided with the capability to purchase events as he wishes.

Both the control word and the access criteria are used to build an Entitlement Control Message (ECM); this is a message sent in relation with one scrambled program; the message contains a control word (which allows for the descrambling of the program) and the access criteria of the broadcast program. The access criteria and control word are transmitted to the second encrypting unit 5102 via the linkage 1040. In this unit, an ECM is generated, encrypted and transmitted on to the multiplexer and scrambler 1030.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast. In respect of each scrambled component of the service, a separate ECM is required.

The multiplexer 1030 receives electrical signals comprising encrypted EMMs from the SAS 5200, encrypted ECMs from the second encrypting unit 5102 and compressed programmes from the compressor 1010. The multiplexer 1030 scrambles the programmes and transmits the scrambled programmes, the encrypted EMMs and the encrypted ECMs as electric signals to broadcast system 600; which may be for example a satellite system as shown in FIG. 1, or other broadcast system. The receiver/decoder 2000 demultiplexes the signals to obtain scrambled programmes with encrypted EMMs and encrypted ECMs.

The receiver/decoder receives the broadcast signal and extracts the MPEG-2 data stream. If a programme is scrambled, the receiver/decoder 2000 extracts the corresponding ECM from the MPEG-2 stream and passes the ECM to the "daughter" smartcard 5500 of the end user. This slots into a housing in the receiver/decoder 2000. The daughter smartcard 5500 controls whether the end user has the right to decrypt the ECM and to access the programme. If not, a negative status is passed to the receiver/decoder 2000 to indicate that the programme cannot be descrambled. If the end user does have the rights, the ECM is decrypted and the control word extracted. The decoder 2000 can then descramble the programme using this control word. The MPEG2 Stream is decompressed and translated into a video signal for onward transmission to television set 10000.

If the programme is not scrambled, no ECM will have been transmitted with the MPEG-2 stream and the receiver/decoder 2000 decompresses the data and transforms the signal into a video signal for transmission to television set 10000.

The subscriber management system (SMS) 1100 includes a database 1150 which manages, amongst others, all of the end user files, commercial offers (such as tariffs and promotions), subscriptions, PPV details, and data regarding end user consumption and authorization. The SMS may be physically remote from the SAS.

The SMS 1100 transmits messages to the SAS 5200 which imply modifications to or creations of Entitlement Management Messages (EMMs) to be transmitted to end users. The SMS 1100 also transmits messages to the SAS 5200 which imply no modifications or creations of EMMs but imply only a change in an end user's state (relating to the authorization granted to the end user when ordering products or to the amount that the end user will be charged). The SAS 5200 also sends messages (typically requesting information such as call-back information or billing information) to the SMS 1100, so that it will be apparent that communication between the two is two-way.

Receiver/Decoder

Figure 4:
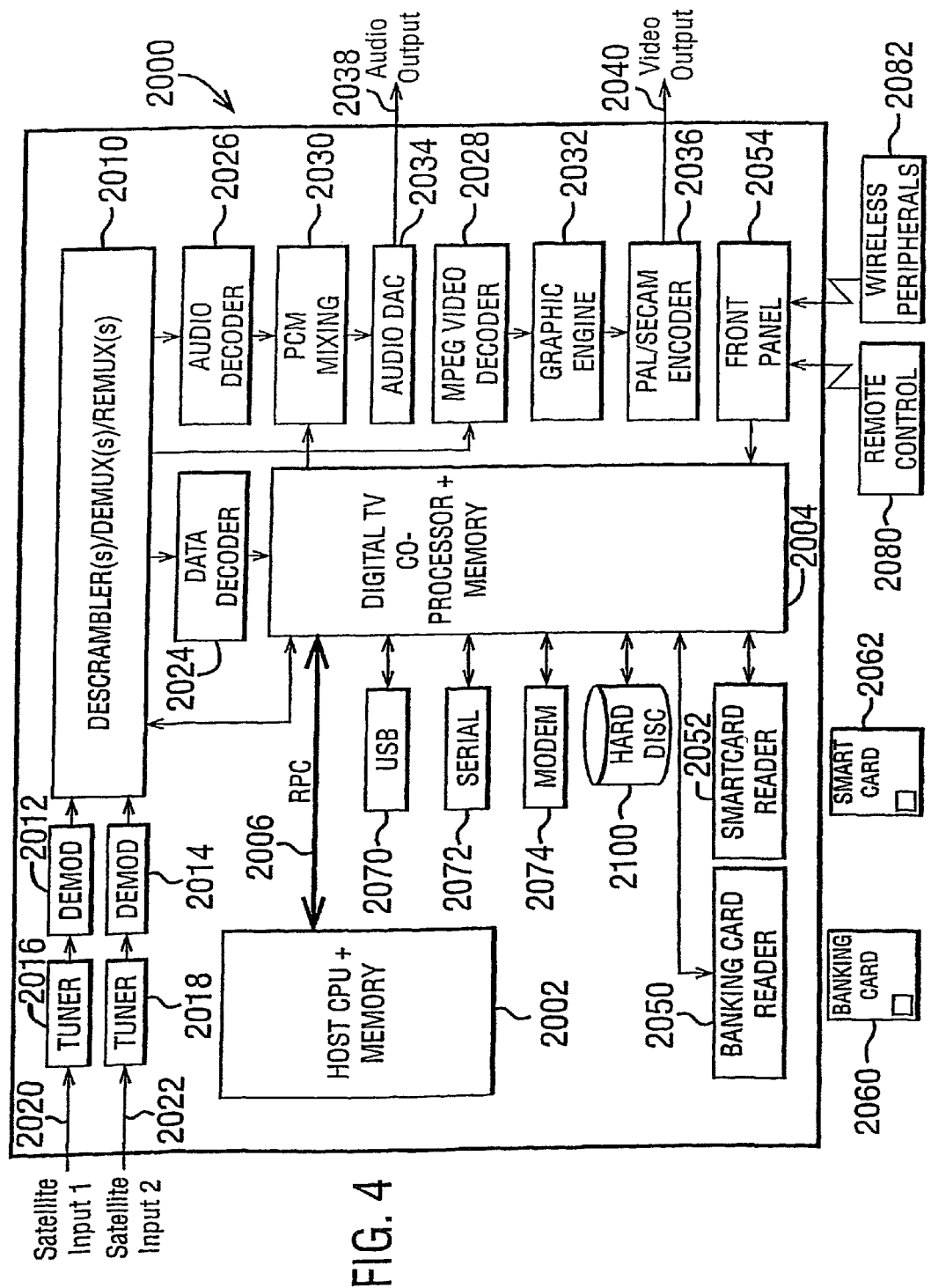
FIG. 4 is a schematic of the component architecture of the receiver/decoder.

Referring to FIG. 4, the various elements of receiver/decoder 2000 will now be described in terms of functional blocks.

The receiver/decoder 2000, which may be, for example, a digital set-top box (DSTB), comprises a central host processor 2002 and a digital TV coprocessor 2004, both having associated memory elements (not shown) and joined by a coprocessor bus 2006. The coprocessor 2004 is adapted to receive input data from a USB interface 2070, a serial interface 2072, a parallel interface (not shown), a modem 2074 (connected to the modem back channel 570 of FIG. 1), and switch contacts on the front panel 2054 of the decoder.

The receiver/decoder is additionally adapted to receive inputs from an infra-red remote control 2080 (and optionally from other wireless peripherals 2082 such as Bluetooth-enabled devices) and also possesses two smartcard readers 2050, 2052 adapted to read bank and subscription smartcards 2060, 2062 respectively. The subscription smartcard reader 2052 engages with an inserted subscription card 2062 and with a conditional access unit (not shown) to supply the necessary control word to a demultiplexer/descrambler/remultiplexer unit 2010 to enable the encrypted broadcast signal to be descrambled. The decoder also includes a conventional tuner 2016 and demodulator 2012 to receive and demodulate the satellite transmission before being filtered and demultiplexed by the demodulator/descrambler unit 2010. A second tuner 2018 and second demodulator 2014 are also provided, to allow, amongst other things, a second channel to be received and decoded in parallel with the first.

A hard disk 2100 is also provided, allowing storage of programme and application data received and generated by the receiver/decoder. In conjunction with the two tuners 2016, 2018, two demodulators 2012, 2014, the descrambler/demultiplexer/remultiplexer 2010, and the data decoder 2024 and audio decoder 2026, advanced recording and playback features are provided, allowing simultaneous recordings of one or more programmes while a further programme is being viewed, and more general transfers to and from the hard disk to and from the display devices and/or inputs and outputs, all occurring in parallel.

The audio output 2038 and video output 2040 in the receiver/decoder are fed by the PCM mixer 2030 and audio DAC 2034, and the MPEG video decoder 2028, graphic engine 2032 and PAL/SECAM encoder 2036 respectively. Alternative or complementary outputs may of course be provided.

As used in this description, an application is preferably a piece of computer code for controlling high level functions of preferably the receiver/decoder 2000. For example, when the end user positions the focus of remote control 2080 on a button object seen on the screen of the television set (not shown) and presses a validation key, the instruction sequence associated with the button is run. Applications and the associated middleware are executed by the host processor 2002, with remote procedure calls (RPCs) being made to the digital TV coprocessor 2004 across the coprocessor bus 2006 as and when required.

An interactive application proposes menus and executes commands at the request of the end user and provides data related to the purpose of the application. Applications may be either resident applications, that is, stored in the ROM (or FLASH or other non-volatile memory) of the receiver/decoder 2000, or broadcast and downloaded into the RAM, FLASH memory or hard disk of the receiver/decoder 2000.

Applications are stored in memory locations in the receiver/decoder 2000 and represented as resource files. The resource files comprise graphic object description unit files, variables block unit files, instruction sequence files, application files and data files.

The receiver/decoder contains memory (not shown) divided into at least one RAM volume, a FLASH volume and at least one ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

Architecture of Receiver/Decoder

Figure 5:
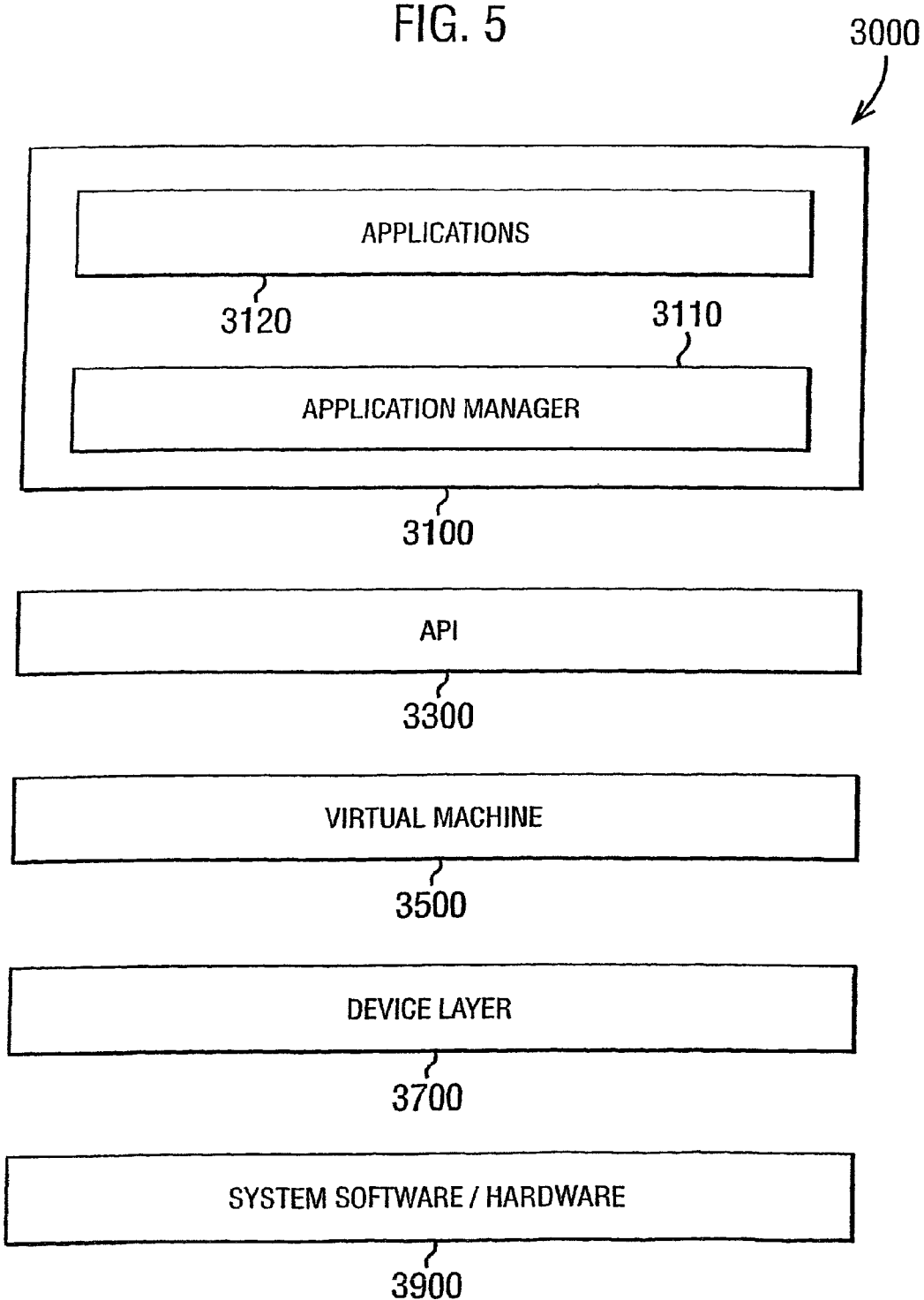
FIG. 5 is a diagram of the software architecture of the receiver/decoder.

With reference to FIG. 5, the software/hardware architecture 3000 of the receiver/decoder contains five software layers, organized so that the software can be implemented in any receiver/decoder and with any operating system. The various software layers are application layer 3100, application programming interface (API) layer 3300, virtual machine layer 3500, device interface layer 3700 (often abbreviated just to 'device layer') and system software/hardware layer 3900.

The application layer 3100 encompasses applications 3120 that are either resident in or downloaded to the receiver/decoder. They may be interactive applications used by customers, written in, for example, Java, HTML, MHEG-5 or other languages, or they may be applications used by the receiver/decoder for other purposes, for example for running such interactive applications. This layer is based on a set of open Application Programming Interfaces (APIs) provided by the Virtual Machine layer. This system allows applications to be downloaded to the hard disk, flash memory or RAM memory in the receiver/decoder on-the-fly or on demand. The application code can be transmitted in compressed or uncompressed format using protocols such as Data Storage Media Command and Control (DSMCC), Network File Server (NFS) or other protocols.

The API layer 3300 provides high-level utilities for interactive application development. It includes several packages that make up this high-level API. The packages provide all the functionality necessary to run interactive applications. The packages are accessible by the applications.

In a preferred embodiment the API is adapted for applications written in the Java, PanTalk or such similar programming languages. Furthermore, it can facilitate the interpretation of HTML and other formats, such as MHEG-5. Besides these features, it also includes other packages and service modules that are detachable and extensible as requirements dictate.

The virtual machine layer 3500 is composed of language interpreters and various modules and systems. This layer, managed by a kernel 3650 (not shown), consists of everything necessary to receive and execute interactive applications in the receiver/decoder.

The device interface layer 3700 includes a Device Manager and software devices (generally referred to herein as just 'devices'). Devices are software modules which consist of the logical resources necessary for management of external events and physical interfaces. The device interface layer, under the control of the Device Manager, manages communication channels between drivers and applications and provides enhanced error exception checking. Some examples of managed (hardware) devices are: card readers 3722 (not shown), modems 3730 (not shown), network 3732 (not shown), PCMCIA (Personal Computer Memory Card International Association), LED display and so on. Programmers do not have to deal with this layer directly, since the API layer controls the devices from above.

The system software/hardware layer 3900 is provided by the manufacturer of the receiver/decoder. Because of the modularity of the system and because services supplied by the higher-level operating system (such as event scheduling and memory management) are part of the virtual machine and kernel, the higher layers are not tied to a particular real-time operating system (RTOS) or to a particular processor.

Typically the virtual machine layer 3500, occasionally in combination with the device interface layer 3700 and/or API 3300, is referred to as the 'middleware' of the receiver/decoder.

Figure 6:
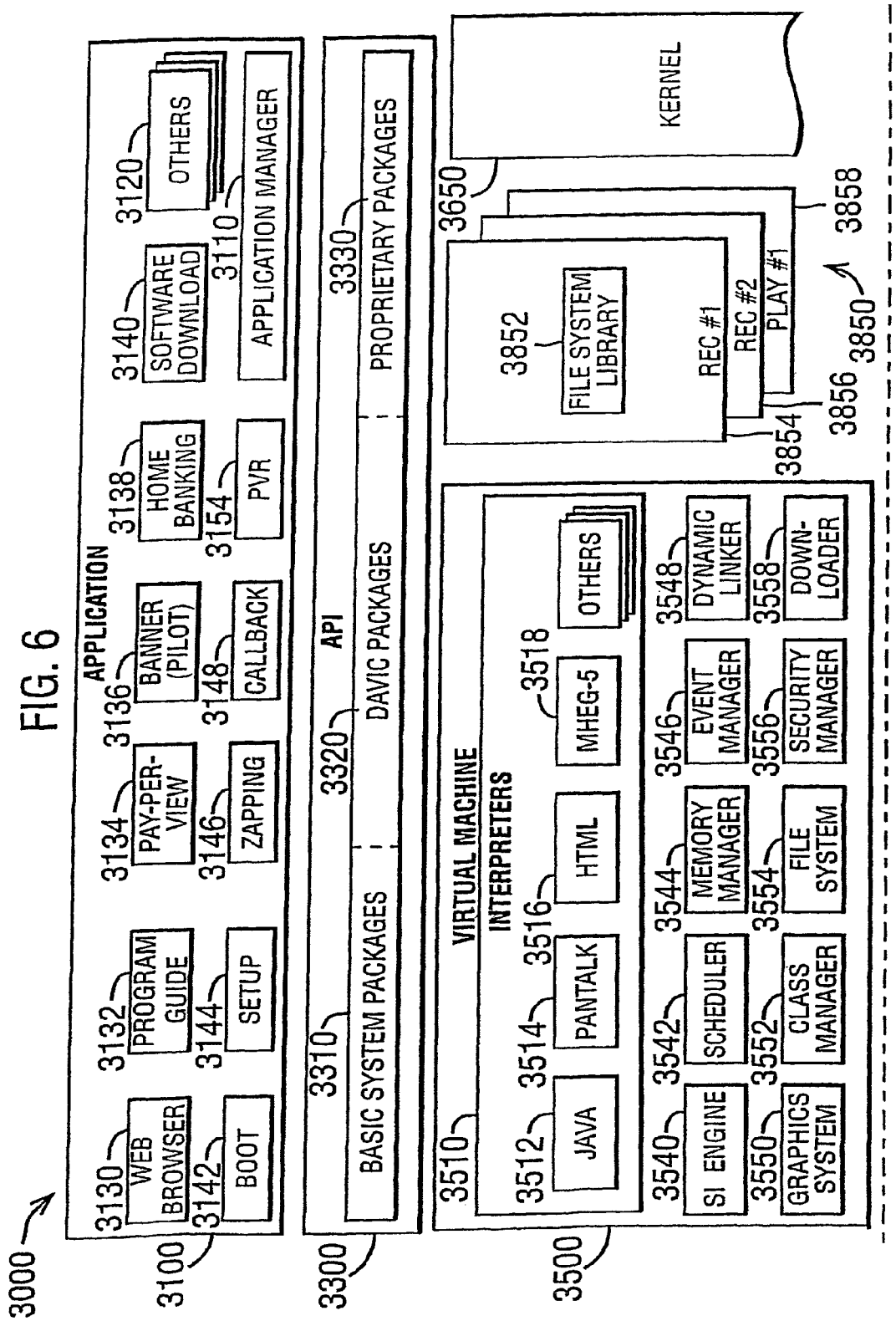
FIG. 6 is a diagram showing the top half of FIG. 5 in more detail.

With reference to FIG. 6 the software architecture of the receiver/decoder 3000 corresponding to the top half of FIG. 5 (comprising the application layer 3100, API layer 3300 and virtual machine layer 3500) will now be described in more detail:

Interactive applications are applications that the user interacts with, for example, to obtain products and services, such as electronic program guides, telebanking applications and games.

There are two types of application in the application layer 3100, plus the Application Manager 3110. There are interactive applications such as a Web Browser 3130 which can be added at any time as long as they conform to the API 3300, and there are resident applications which manage and support the interactive applications. The resident applications are substantially permanent and include the following:

Boot. The Boot application 3142 is the first application launched when the receiver/decoder is powered on. The Boot application first starts the Application Manager 3110, and then starts the "Manager" software modules in the virtual machine 3500, such as the Memory Manager 3544 and the Event Manager 3546.

Application Manager. The Application Manager 3110 manages the interactive applications that are run in the receiver/decoder, that is, it starts, stops, suspends, resumes, handles events and deals with communication between applications. It allows multiple applications to run at once, and thus is involved in the allocation of resources among them. This application is completely transparent to the user.

SetUp. The purpose of the SetUp application 3144 is to configure the receiver/decoder, primarily the first time it is used. It performs actions such as scanning for TV channels, setting the date and time, establishing user preferences, and so on. However, the SetUp application can be used at any time by the user to change the receiver/decoder configuration.

Zapping. The Zapping application 3146 is used to change channels using the Program-up, Program-down and numeric keys. When another form of zapping is used, for example, through a banner (pilot) application, the Zapping application is stopped.

Callback. The Callback application 3148 is used to extract the values of various parameters stored in the receiver/decoder memory and return these values to the commercial operator via modemmed back channel 1070 (not shown), or by other means.

Other applications in the application layer 3100 include a program guide application 3132, a pay-per-view application 3134, a banner (pilot) application 3136, a home banking application 3138, a software download application 3140 and a PVR (personal video recorder) application 3154 (see below).

As noted above, the Application Programming Interface (API) layer 3300 contains several packages. These include basic system packages 3310, used, for example, to access basic features of the virtual machine, DAVIC packages 3320, and proprietary packages 3330, used to access features of the software architecture unique to the principal software vendor.

Considered in more detail, the virtual machine 3500 includes the following:

Language Interpreters 3510. Different interpreters can be installed to conform to the type of applications to be read. These include Java interpreters 3512, PanTalk interpreters 3514, HTML interpreters 3516, MHEG-5 interpreters 3518 and others.

Service Information (SI) Engine. The SI Engine 3540 loads and monitors common Digital Video Broadcasting (DVB) or Program System Information Protocol (PSW) tables and puts them into a cache. It allows access to these tables by applications which need the data contained in them.

Scheduler 3542. This module allows for pre-emptive, multithreaded scheduling with each thread having its own event queue.

Memory Manager 3544. This module manages the access to memory. It also automatically compresses data in memory when necessary and performs automatic garbage collection.

Event Manager 3546. This module allows events to be triggered according to priority. It manages timer and event grabbing and allows applications to send events to each other.

Dynamic Linker 3548. This module allows the resolution of addresses arising from native Java functions, loads native methods from a Java class downloaded into RAM and resolves calls from downloaded native codes towards ROM.

Graphics System 3550. This system is object-orientated and optimized. It includes graphic window and object management as well as a vectorial font engine with multi-language support.

Class Manager 3552. This module loads classes and resolves any class referencing problems.

File System 3554. This module is compact and optimized to manage a hierarchical file system with multiple ROM, flash, RAM and DSMCC volumes. Flash integrity is guaranteed against any incidents.

Security Manager 3556. This module authenticates applications and controls the access of applications to sensitive memory and other zones of the set-top box.

Downloader 3558: This module uses automatic data loading from a remote DSMCC carousel or through the NFS protocol, with downloaded files accessed in the same way as resident ones. Memory clear-up, compression and authentication are also provided.

Furthermore, the DAVIC resource notification model is supported so that client resources are efficiently managed.

A kernel 3650 manages the various different processes running in the virtual machine 3500 and device interface layer 3700 (not shown). For efficiency and reliability reasons, the kernel implements relevant parts of the POSIX standard for operating systems.

Under control of the kernel, the virtual machine (running Java and Pantalk applications) runs in its own thread, separate to other 'server' elements of the operating system, such as the mass storage server 3850 (not shown). Corresponding provisions, such as requiring Thread IDs to be passed as parameters in system calls; are also made in the API layer 3300 to allow the applications 3120 to benefit from the multithreaded environment.

By providing multiple threads, more stability can be achieved. For example, if the virtual machine 3500 ceases to operate for some reason, by suffering a crash or being blocked for a long time by an application trying to access a device, other time-critical parts of the system, such as the hard disk server, can continue to operate.

As well as the virtual machine 3500 and kernel 3650, a hard disk video recorder (HDVR) module 3850 is provided for handling the recording and playback functions of the hard disk 2210 or other attached mass storage component. The server comprises two separate threads 3854, 3856 handling recording, one thread 3858 for handling playback, and a file system library 3852 for interfacing with the mass storage components.

An appropriate one of the threads 3854, 3856, 3858 in the hard disk video recorder (HDVR) 3850 receives commands (such as a command to start recording a particular programme) from clients such as the personal video recorder (PVR) application 3154, in response to the user pressing a 'record' button, for example.

In turn, the thread in question then interacts with the service device 3736 (shown in FIG. 7) to set up and synchronise the parts of the receiver/decoder handling the bitstream to be recorded or played back. In parallel, the thread also interacts with the file system library 3852 to coordinate the recording or playback operation at appropriate places on the hard disk 2210 (not shown).

The file system library 3852 then sends commands to the mass storage device 3728 (also shown in FIG. 7) which tell the mass storage device 3728 which sub-transport stream (STS) to transfer (via a FIFO buffer), and on which hard disk target the stream should be stored. Allocation of clusters on the hard disk and general file management is carried out by the file system library 3852, the mass storage device itself being concerned with lower level operations.

The service device 3736 mentioned above is unique amongst the devices in that it does not relate to a physical component of the receiver/decoder. It instead provides a high level interface which groups together in a single 'instance' the various sets of tuner, demultiplexer, remultiplexer and hard disk devices in the receiver/decoder, freeing higher level processes from the difficulties of coordinating the various subdevices.

Figure 7:
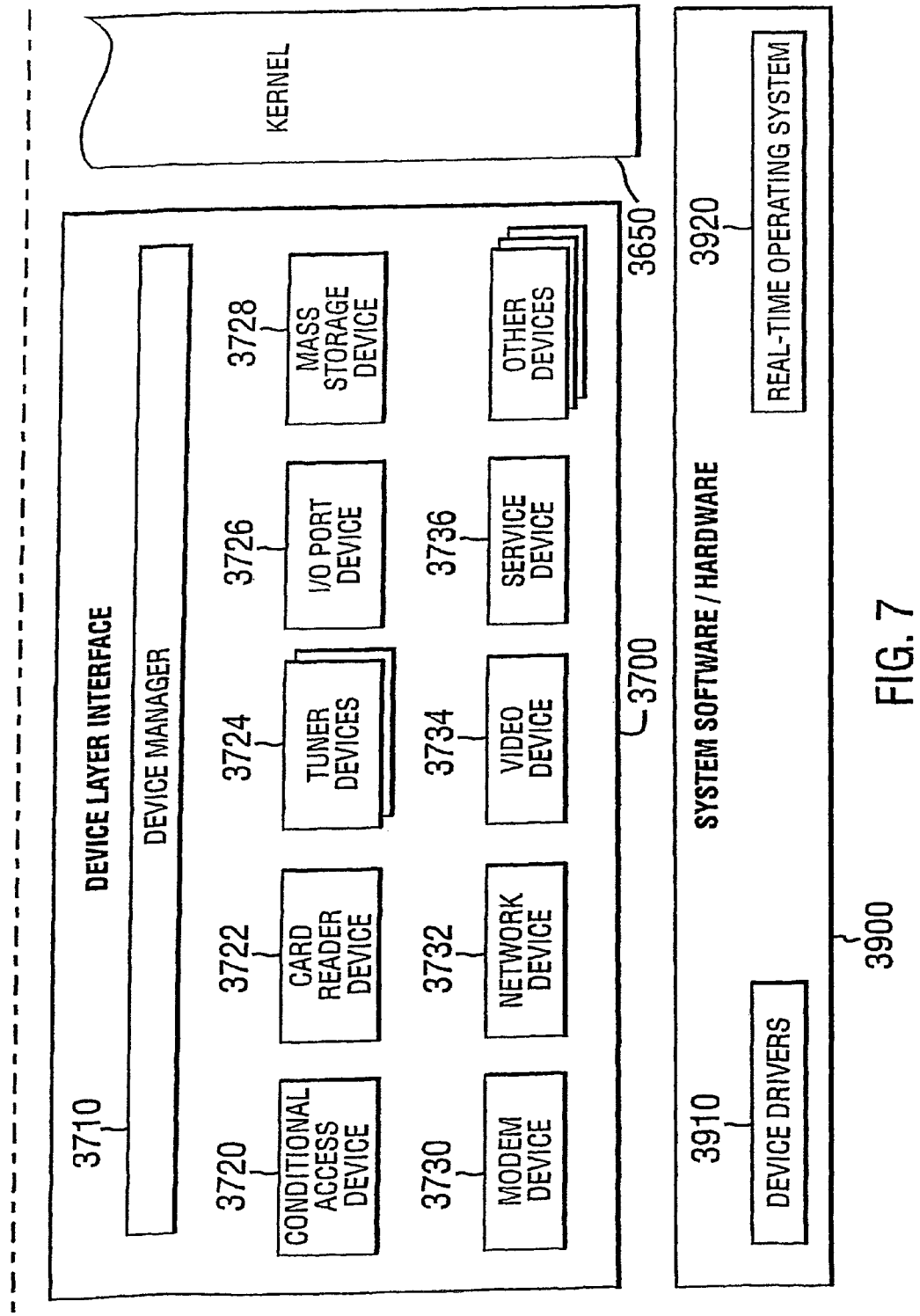
FIG. 7 is a diagram showing the bottom half of FIG. 5 in more detail.

With reference to FIG. 7 the software architecture of the receiver/decoder 3000 corresponding to the bottom half of FIG. 5 (comprising the device interface layer 3700 and the system software and hardware layer 3900) will now be described in more detail.

Further devices provided in the device layer include the conditional access device 3720, tuner devices 3724 corresponding to the two (or potentially more) tuners 2016, 2018 of FIG. 4, the video device 3734, the I/O port device 3726, and the service device 3736 and mass storage device 3728 mentioned above.

In broad terms, a device can be regarded as defining a logical interface, so that two different devices may be coupled to a common physical port. Certain devices may communicate among themselves, and all devices also operate under the control of the kernel 3650.

Before using the services of any device, a program (such as an application instruction sequence) has to be declared as a "client", that is, a logical access-way to the device or the device manager 3710. The manager gives the client a client number which is referred to in all accesses to the device. A device can have several clients, the number of clients for each device being specified depending on the type of device. A client is introduced to the device by a procedure "Device: Open Channel". This procedure assigns a client number to the client. A client can be taken out of the device manager 3710 client list by a procedure "Device: Close Channel".

The access to devices provided by the device manager 3710 can be either synchronous or asynchronous. For synchronous access, a procedure "Device: Call" is used. This is a means of accessing data which is immediately available or a functionality which does not involve waiting for the desired response. For asynchronous access, a procedure "Device: I/O" is used. This is a means of accessing data which involves waiting for a response, for example scanning tuner frequencies to find a multiplex or getting back a table from the MPEG stream. When the requested result is available, an event is put in the queue of the engine to signal its arrival. A further procedure "Device: Event" provides a means of managing unexpected events.

Figure 8:
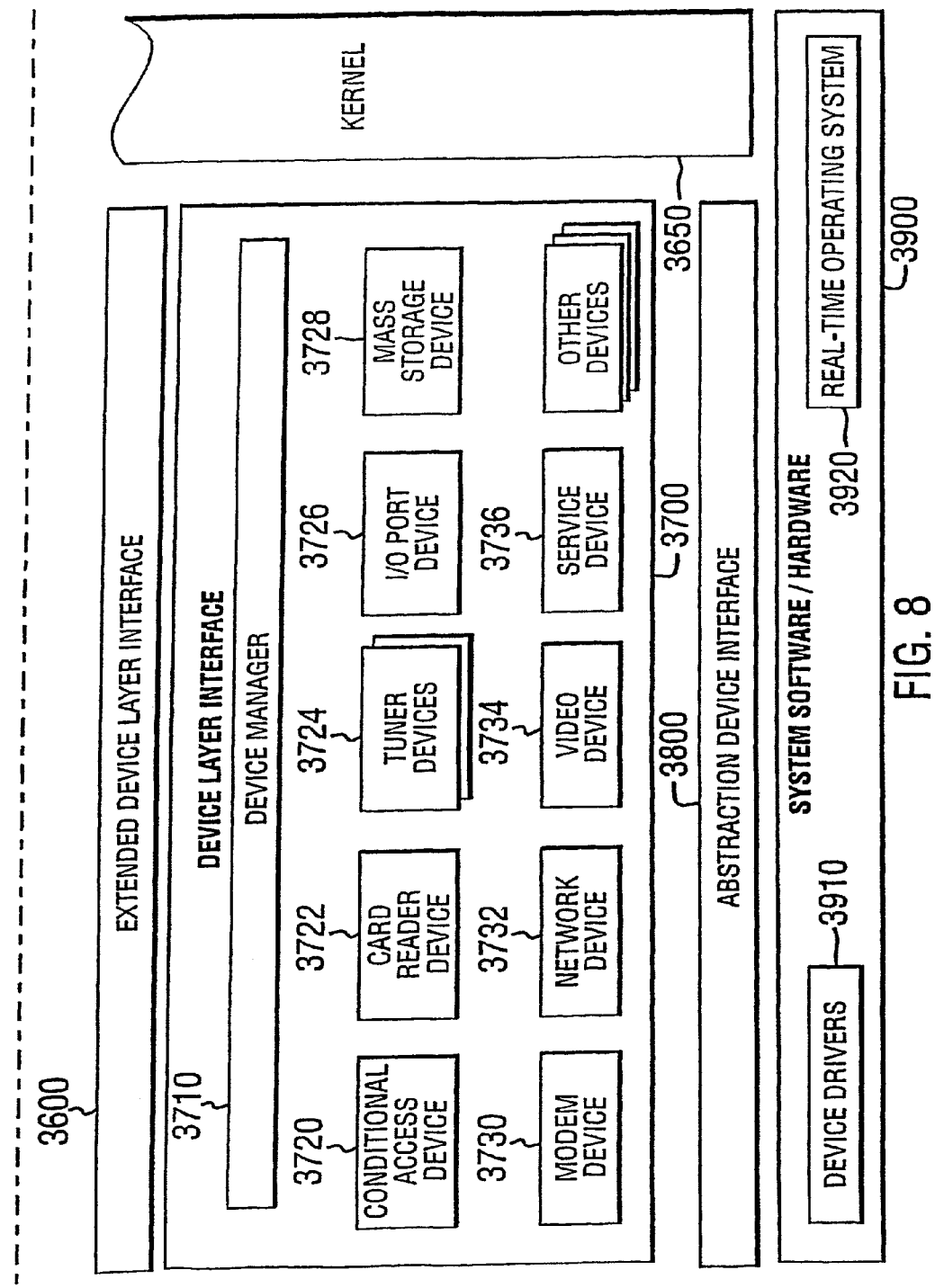
FIG. 8 is a diagram showing an alternative embodiment of the bottom half of FIG. 5.

In a second embodiment of the receiver/decoder, the lower half of the architecture of the receiver/decoder is replaced by the layers shown in FIG. 8.

In this embodiment, an extended device layer interface (EDLI) 3600 is provided between the virtual machine 3500 (not shown) and the device interface layer 3700, and an abstraction device interface 3800 is provided between the device interface layer 3700 and the system software/hardware layer 3900. Otherwise, like parts are indicated with like reference numerals.

The extended device layer interface (EDLI) 3600 provides a dedicated interface between the virtual machine 3500 and the device interface layer 3700 and generally provides multithreading support to the device interface layer. Functions of the EDLI include routing asynchronous events to the appropriate thread in the middleware (since the device interface layer need not itself support multithreading) and routing messages between threads.

The abstraction device interface 3800 provides a further interface between the device interface layer 3700 and the device drivers 3910 in the system software/hardware layer 3900. By providing such an interface, the large and complex device layer 3700 can be made hardware independent to a greater degree.

One of the applications 3120 shown in FIG. 6 is a Profile Manager which creates and edits profiles. The Profile Manager is a resident application which prompts an end user to enter profile data using the remote control 2080. The profile data may include the end user's city/region of residence, marital status, age, or interests (for instance indicating that the end user is interested in sport, news and action movies). The profile data is stored in the hard drive 2100 by the Profile Manager and the end user may edit the stored profile data at any time.

In an alternative, the Profile Manager may create a profile by monitoring the viewing habits of the end user and setting up the profile accordingly. For instance the Profile Manager may observe that the end user watches a lot of sport, news and action movies; and record profile data which ensures that the user is presented with programmes in these categories. In a variant of the preferred embodiment, the SetUp application and other applications and/or parts of the middleware perform the role of the Profile Manager described above.

Three different types of 'virtual channel' system will now be described with reference to FIGS. 9 to 12 (first and second embodiments), FIG. 13 (third embodiment) and FIG. 14 (fourth embodiment).

Personalised Advertisements

As mentioned above, under the control of the user of the receiver/decoder, programmes of various sorts can be recorded to the hard disk within the receiver/decoder for later viewing. The receiver/decoder can also be programmed in advance to record various specific programmes or genres of programmes, but in essence the process remains a time-shifting operation.

The first embodiment shown in FIGS. 9(*a*), (*b*), (*c*), 10, 11 and 12 uses the hard disk to prerecord sets of advertisements, and interleaves the advertisements between scheduled programmes broadcast to the receiver/decoder. In FIGS. 9(*a*), (*b*) and (*c*), like parts are indicated by like numerals.

With reference to FIG. 9(*a*), a broadcast centre 1000 and receiver/decoder 2000 are shown, the receiver/decoder comprising video decoding circuitry 2250 and a hard disk 2100. At regular scheduled intervals (for instance every day between the hours of 3 am and 5 am, when fewer television channels are broadcast and more bandwidth is available) the broadcast centre 1000 transmits a series of advertisements 840 to the receiver/decoder 2000 via a broadcast medium (cable or satellite, typically). The receiver/decoder 2000 then stores the advertisements in special location 7050 on the hard disk 2100.

The advertisement data 840 is broadcast on a single channel. Under the management of an Advertisement Manager application, a download mechanism such as an Action Notification Table (ANT, described later) within the receiver/decoder ensures that one of the tuners 2016, 2018 is tuned to the required channel during the scheduled time slot (in this case between 3 am and 5 am), and commands the storage of the data on the hard disk 2100. A large number of advertisements (for example fifty) may be stored.

In variants of the preferred embodiment, described in more detail elsewhere, the advertisements 840 are sent via other means, using point-to-point connections such as the internet or a telephone connection, or using other broadcast means, such as radio, cable and satellite links, for example. In a further variant of the preferred embodiment, other types of recording device, such as an analogue video recorder or digital video recorder, are used in place of the hard disk 2100.

With reference to FIG. 9(*b*), showing the broadcast system at a different time—later in the day, for example—the broadcast centre 1000 broadcasts programme content 850 to the receiver/decoder 2000. The programme content is then processed by the video decoding circuitry 2250 and output at the video output 2040, subsequently being displayed on a television 10000 (not shown).

At a predetermined time—such as at the onset of an advertisement break, for example—a Virtual Channel Information Message (VCIM) 7060 (not shown) is inserted into the programme content 850 and is received by the Advertisement Manager application.

With reference to FIG. 9(*c*), the Advertisement Manager application then commences playback of one or more appropriate advertisements from the stored pool of advertisements 7050, preferably matching the target data associated with each advertisement (see below) and the optional profile information in the VCIM (also see below) with the profile generated by and in respect of the current user.

The format of the Virtual Channel Information Message (VCIM) 7060 is now described, with reference to FIG. 10. The VCIM 7060 comprises a header 7070, category code 7072, schedule information block 7074, optional profile information 7076, and optional signature 7078. The header 7070 contains a magic number identifying the type of message and one field in the header specifies the length of the message. The category code 7072 identifies the type of programming which is required, namely an advertisement. The schedule information block 7074 contains several fields identifying, amongst other things, the length of programming (or, more specifically, advertisement break) which is required, and the minimum and maximum number of programme elements (such as individual advertisements) which can be combined to achieve the required duration. The optional profile information 7076 provides further profiling information to supplement, replace or bias the profiling information supplied by the user or with the individual advertisements (as explained above).

As explained in more detail below, the suitability of each stored advertisement or other programme is considered in terms of the closeness of the match between the local user profile and target data in the stored advertisement or other programme, and other factors such as the number of times a given advertisement has been repeated in a given time period, and the time passed since the advertisement was received.

The profile information 7076 mentioned above provides further 'fine tuning' for the selection of advertisements for a given user. For example, a user whose (explicitly selected or otherwise inferred) profile suggested a preference for sport-related programming would in general tend to be shown more sport-related advertisements than food-related advertisements. For a late-night cookery programme, for example, the profile information 7076 in a VCIM 7060 transmitted at the start of an advertisement break might, however, specify a negative bias for sporting preferences, and a positive bias for food preferences, which could leading to an advertisement for a pasta sauce being displayed in preference to an advertisement for sports shoes.

In a variant of the preferred embodiment, information regarding the scheduling and other features of the personalised advertisements is instead supplied en masse "offline"

in advance of the programmes to be scheduled, in a scheduled broadcast using a predefined programme ID (PID), for example. Alternatively, a simple marker message is transmitted in the broadcast bit stream when a personalised advertisement is required. In these cases, the choice of advertisement or programme is not affected by any further profile information, since none is specified.

The advertisement data itself has the format shown in FIG. 11. Along with video and audio, the advertisement data also includes target data. For example one set of advertisement data shown in FIG. 11 consists of a Video component 7002, Audio component 7003 and Target component 7004. The target component 7004 indicates that the advertisement is targeted at end users resident in Paris, who are single and interested in football. The next advertisement has a target component 7011 which indicates that the advertisement is targeted at end users resident in Marseille (France), who are married and interested in travel.

To illustrate the above principles, FIG. 12 shows the programmes presented to four different users during five adjacent time slots. During a first time slot, the broadcast centre broadcasts a Movie 8000 which is simultaneously presented to each of the four end users. During an advertisement time slot following the movie 8000, the Advertisement Manager resident on each user's receiver/decoder 2000 compares the target data and profile data stored on hard disk 2100, and selects an advertisement that fits the profile of the end user. Thus, in the example of FIG. 12 each user has a different profile so is presented with a different advertisement 8001-8004. During third and fifth scheduled time slots the users are all presented with a News Story 8010 and a Serial 8002. In the intervening advertising time slot, the four users are presented with different advertisements 8011-8014.

Since disk space is limited, when the next set of advertisements are broadcast (for example next day between 3 am and 5 am) the Advertisement Manager may overwrite any advertisements which have been presented, or which do not match the stored profile.

In the preferred embodiment, the Advertisement Manager application is supplied separately to a Virtual Channel Manager application. In variants of the preferred embodiment, however, the Advertisement Manager application forms a part of a more general Virtual Channel Manager application. Alternatively, certain functions performed by both applications in the preferred embodiment are instead performed by other applications, such as the Personal Video Recorder (PVR) application 3154.

A log of the presented advertisements can be created and sent back to the broadcast centre when a back-channel connection is available in order to process this kind of information for any commercial or marketing purpose. In the preferred embodiment, the log file lists the content ID of each advertisement which is played back, along with the date, time and channel name on which it was displayed.

The structures of the user profile, target data and profile information are discussed in more detail later.

Virtual Channels

The provision of virtual channels, either fully based and generated from content stored locally at the receiver/decoder, or based on concurrent content transmitted on different live streams (the virtual channel in this case being composed from parts of each stream), will now be described (hybrid systems, combining both aspects, are also possible).

In the second embodiment, programme content is transmitted to the receiver/decoder and stored on a mass storage device, such as a hard disk, using the same systems used for transferring and storing advertisements, as described above.

In common with the replaying of advertisements, the virtual channel relies on the user profile to customise the programme output. Features such as the storage and 'garbage collection' of programme material also operate in a similar way to the personalised advertisements system. In variants of the preferred embodiment, the virtual channel and personalised advertisements file handling and other systems are, in fact, essentially combined.

In contrast to the personalised advertisements, however, the playing back of personalised content is continuous and unprompted—entirely within the control of the receiver/decoder (except where external control is desired). In addition, programme compatibility rules are required, and will be described later.

It is also possible to construct more than one 'virtual channel' from the locally stored content, using different rules for 'constructing' the channel, and combining live and stored output.

Referring now to the third embodiment shown in FIG. 13, the broadcast centre 1000 broadcasts scheduled programmes simultaneously on a number of channels. In this example, Advertisement 9000, Movie 9001, Advertisement 9002 and Sports Event 9003 are broadcast on a first channel; Advertisement 9010, News Report 9011, Advertisement 9012 and Movie 9013 are broadcast on a second channel; and Advertisement 9020, Movie 9021, Advertisement 9022 and Movie 9023 are broadcast on a third channel.

Each broadcast programme includes a video, audio, time stamp and category component. For example, Movie 9021 includes a Video component 9030, Audio component 9031, Time Stamp component 9032 and Category component 9033. The Time Stamp component 9032 indicates the duration of the Movie 9021. The Category component 9033 indicates the category of the Movie 9021 (for example, an action movie). As well as the components described above, advertisements also include target data. For instance Advertisement 9022 includes a Video component 9040, Audio component 9041, Time Stamp component 9042, Category component 9043 and Target component 9044. The Target component 9044 indicates the type of user that the advertisement is targeting.

As mentioned above, a Virtual Channel Manager application is provided. When enabled, the Virtual Channel Manager application scans through the different channels and selects programmes which match the profile created by the Profile Manager. Thus in the example of FIG. 11, the Advertisement 9000 may be a car advertisement with a target component indicating that the advertisement is targeted towards male users over the age of thirty. The Virtual Channel Manager compares the target component with the stored profile, and since the profile matches, the Virtual Channel Manager tunes the tuner 2016 to the first channel and stores the Advertisement 9000 on hard disk 2100 with a unique file name. At the end of the Advertisement 9000, the Virtual Channel Manager scans through the channels until it finds the start of the next programme (in this case News Report 9011) having a category and/or target component which matches the stored profile. Following the selection, the Virtual Channel Manager tunes the tuner 2016 to the second channel and stores the News Report on hard disk 2100. At the end of the News Report 9011, the Virtual Channel Manager scans through the channels until it finds the start of the next programme (in this case Advertisement 9002) which matches the stored profile. The Virtual Channel Manager carries out this process continuously (subject to available space on the hard disk 2100), and over the course of time compiles a library of programme data of the type shown below in Table 1.

TABLE 1

PROGRAMME DATA LIBRARY

| FILE# | CATEGORY | TARGET | TIME (min) |
|---|---|---|---|
| #1 | Action Movie | | 120 |
| #2 | Horror Movie | | 110 |
| #3 | Drama Movie | | 135 |
| #4 | Renault Car Advertisement | Males over thirty | 2 |
| #5 | Bank Advertisement | Adults over sixteen | 1 |
| #6 | Rover Car Advertisement | Adults between twenty and thirty | 1 |
| #7 | National News | | 10 |
| #8 | International News | | 15 |
| #9 | Baseball Game | | 120 |
| #10 | Rugby Game | | 100 |

At any time, a user can either watch one of the broadcast channels shown in FIG. 13, or a prerecorded virtual channel. If the user wants to watch the virtual channel, then the user selects the virtual channel using remote control 2080. At this point, the Virtual Channel Manager runs a scheduling algorithm based on various rules discussed below (such as application-specific rules, general rules and user-defined rules). The scheduling algorithm composes a virtual channel playback schedule from the programme data library. An example of a typical schedule is shown below in Table 2.

TABLE 2

VIRTUAL CHANNEL PLAYBACK SCHEDULE

| FILE# | CATEGORY | START TIME | FINISH TIME |
|---|---|---|---|
| #1 | Action Movie | 1500 | 1700 |
| #4 | Renault Car Advertisement | 1700 | 1702 |
| #10 | Rugby Game | 1702 | 1842 |
| #5 | Bank Advertisement | 1842 | 1843 |
| #7 | National News | 1843 | 1853 |
| #6 | Rover Car Advertisement | 1853 | 1854 |

Referring now to the fourth embodiment shown in FIG. 14, scheduled programmes are broadcast to users simultaneously on a number of channels. In the example illustrated in FIG. 13, only three channels are shown, but in general there may be any number of channels. A movie channel broadcasts Movies 9550 and 9551 preceded by Advertisements 9552 and 9553. A sports channel broadcasts Sports Events 9560 and 9561 preceded by Advertisements 9562 and 9563. A news channel broadcasts News 9570 and 9571 preceded by Advertisements 9572 and 9573.

The start and stop times of the programmes are shown in FIG. 14 as times t1-t8. FIG. 14 can be contrasted with FIG. 13. In FIG. 13 the start and stop times of the programmes are unsynchronised. In contrast, in FIG. 14 the programmes all stop and start simultaneously. In other words, advertisements 9552, 9562, 9572 stop and start at times t1 and t2 respectively, programmes 9550, 9560, 9570 stop and start at times t3 and t4, and so on.

The format of the broadcast programmes shown in FIG. 14 is similar to the format shown in FIG. 13. However, in the case of FIG. 14 the control data associated with each programme (that is, the time stamp component, category component, target component and rule component) is broadcast during programme breaks t2-t3, t4-t5 and t6-t7 in advance of the video and audio components (which are simultaneously broadcast and displayed during programme times t1-t2, t3-t4, t5-t6, t7-t8).

The Virtual Channel Manager application switches between the different channels in accordance with a virtual channel algorithm similar to the scheduling algorithm described above with reference to the second embodiment. In more detail, during a programme break t2-t3, the Virtual Channel Manager application receives control data associated with Movie 9550, Sports Event 9560 and News 9570. The virtual channel algorithm then analyses the control data in accordance with a set of rules, and determines which channel to select (in this case, the sports channel). Thus in the example of FIG. 14, the Virtual Channel Manager selects the Advertisement 9552 on the movie channel, followed by the Sports Event 9560 on the sports channels, followed by the Advertisement 9553 on the movie channel and the News 9571 on the news channel.

Programme Compatibility Rules

As mentioned above, the virtual channel algorithm for choosing between channels makes use of various rules, which may include application-specific rules, general rules and user-defined rules. These rules may typically either be retrieved from store, or received with the control data in the programme breaks.

An example of specific rules is given back in FIG. 13. The Advertisement 9012 includes a Video component 9050, Audio component 9051, Time Stamp component 9052, Category component 9053, Target component 9054 and Rule component 9055. The rule component may be a programme-specific rule dictated by the advertiser and associated with that particular advertisement, such as: "this advertisement must be presented to a user in an advertising slot without any other advertisements". Alternatively the rule component may be a general rule such as "at least one advertisement must be presented immediately before and immediately after each movie".

Other examples of general rules (which are predefined defaults for the application, or sent later by the broadcast centre 1000) are: "at least one Advertisement must follow a movie"; and "at least one News Report must occur within every four hour time slot". Another example of an application-specific rule dictated by an advertiser is: "no car advertisement from a competitor may be played within two hours of this advertisement".

Further examples include rules such as "a news bulletin will be displayed between 7 pm and 9 pm", "no children's programmes after 8 pm", "movies rated as 'violent' shall not be displayed before 10 pm", "some movies cannot be watched more than once", and so on.

The user may also create virtual channel playback rules which are incorporated into their profile by the Profile Manager. An example of a user-defined rule is: "I would like each movie to be followed by a sports event".

Some of the rules may make use of the time component transmitted with the programmes. For instance, a general rule may state that "no advertising slot may run for more than three minutes". Thus the scheduling algorithm may compile an advertising time slot with three one minute advertisements, or with a single three minute advertisement.

It can be seen that the user has a certain amount of control over the content of the virtual channel, by means of the profile (which influences what programmes are stored into the library) and by means of the user-defined rules (which influence the schedule). However the content and/or schedule of the virtual channel can also be centrally controlled by means of the application-specific and general rules.

As can be seen from the above, the various rules also apply equally to the more particular application of personalised advertisements.

Transmission of Profiling Rules

A set of virtual channel playback rules are provided by default with the Virtual Channel Manager application, and are transmitted to the receiver/decoder along with the rest of the application (or otherwise provided with the application if the application is supplied by non-broadcast means). These may be rules created by the author of the application, or may be dictated by advertisers or other content providers. Once installed or loaded, the rules are stored on hard disk 2100 as part of the Virtual Channel Manager application. In a variant of the preferred embodiment, the rules are held in flash memory (on a smartcard, for example, for extra security and portability), or in normal RAM (if no mass storage device or flash memory is conveniently available).

The default rules may be edited or augmented by subsequent downloads from the broadcast centre 1000, for instance by transmitting new rules on a specific predetermined programme ID (PID) along with the programme data shown in FIG. 13.

The ability to completely update the set of rules applied by the receiver/decoder 2000 (not shown) from a remote site is particularly useful in the case where privacy laws forbid the reading of certain (or any) specific information from a receiver/decoder by a head-end or other part of a broadcast system. The ability to transmit new rules at arbitrary times, and in respect of any particular times, users, receiver/decoders, programmes or channels, can remove the need for direct intervention by a broadcaster in order to effect a given advertising or programming strategy, for example.

In the preferred embodiment, generic MPEG 'private' tables are used to convey the rules to the receiver/decoder 2000. This type of table is described in more detail in European Patent Application No. 01306315.1 in the name of the present applicant, the contents of which application are herein incorporated by reference.

The management and structure of these tables, and their application to the transmission of rules and content to the receiver/decoder, will now be described.

To interpret the generic table structure described below, a parser is provided as part of the operating software of the set top box. The construction of such a parser given the defined data structures can easily be carried out by a person skilled in the art. Therefore, only some basic requirements will be outlined here.

A parser layer comprising a parser provides a layer of abstraction between the application layer and the MPEG table reception and filtering layer, which extracts information sent by the broadcast centre via the programme stream.

The effect of this abstraction is that the different applications do not have to be specifically adapted to a large number of different table formats for the different kinds of data they deal with. The parser processes the received table sections and extracts the relevant information, passing it on to an application in the application layer, such as the Advertisement Manager mentioned above.

The generic table format described below allows for different types of data to be organized within the same table structure. Individual data items, stored in a table section as collections of common and specific attribute descriptors contain the information required by an application. Descriptor formats may vary; a simple header, in the above examples comprising a tag specifying the type of information and a size attribute, is provided to enable the parser to correctly extract the information and pass it on to an application.

Furthermore, the sizes of descriptor lists are provided in the form of the Common_Descriptor_info_length field and the Extra_Identifier_descriptor_length field to enable the parser to extract them accurately. The parser does not need to concern itself with the meaning or function of individual data items; it simply passes the data on to an application. The parser therefore does not need to be aware of the different types of information it may receive; the interpretation of the information is performed by the application. The parser merely strips the transmission-related information contained in the header and passes the actual data content of tables to the application in a suitable, generic form. Thus, the parser is able to process different types of tables of variable length. The design of the parser is governed only by the design of the general purpose tables, not by the different types of information used by the different applications.

To allow for further table section formats, the current format provides a parse format field (Data_Parsing_Format). The header section before this field remains constant in size in all table formats so that the parser can correctly identify the field, which it uses to determine the format of a private table section and thus choose the appropriate strategy for parsing it.

In the present case, Table 3 shows the high-level structure of the table used to convey the advertisement sequence rules to the receiver/decoder (the 'Virtual Channel Management Table', VCMT). It can be observed that this format is essentially generic and can be adapted to other applications, such as the Action Notification Table (ANT) described below.

TABLE 3

VIRTUAL CHANNEL MANAGEMENT TABLE

| Name | Unit | Size (bits) | Default value |
|---|---|---|---|
| Long_Private_section( ) { | | | |
|     Table_id | Uimsbf | 8 | |
|     Section_syntax_indicator | Bslbf | 1 | 1 b |
|     Private_syntax_indicator | Bslbf | 1 | 1 b |
|     ISO reserved | Bslbf | 2 | 11 b |
|     Section_length | Uimsbf | 12 | Max value = 0xFFD |
|     Tid_extension | Uimsbf | 16 | Tid_ext |
|     Reserved | Bslbf | 2 | 11 b |
|     Version_number | Uimsbf | 5 | |
|     Current_next_indicator | Bslbf | 1 | 1 b |
|     Section_number | Uimsbf | | |
|     Last_section_number | Uimsbf | | |
|     Filter_extension | Uimsbf | | |
|     Data_parsing_format | Uimsbf | | |
|     Priority | Bslbf | | |
|     Data_parsing_format_flag | Bslbf | | |
|     Reserved | Bslbf | | |
|     Common_descriptor_info_length | Uimsbf | | |
|     For (i=0; i<N1; i++) { | | | |
|         Descriptor( ) | | | |
|     } | | | |
|     For (i=0; i<N2; i++) { | | | |
|         Extra_identifier_length | Uimsbf | | |
|         Extra_identifier | Uimsbf | | |
|         Reserved | Bslbf | | |
|         Extra_identifier_descriptor_length | Uimsbf | | |
|         For (i=0; i<N3; i++) { | | | |
|             Descriptor( ) | | | |
|         } | | | |
|     } | | | |
|     CRC_32 | Rpchof | | |
| } | | | |

The units are well-known abbreviations in the context of Digital Video Broadcasting (DVB) standards; for example, Uimsbf stands for Unsigned Integer (Most Significant Bit First), and Bslbf stands for Bit String (Left Bit First).

The data_parsing_format setting assists the generic table parser in case the data format changes in future versions. The data_parsing_format value modulo 256 gives the table format version number.

The priority setting takes one of four values depending on the priority associated with the private data (0 being highest priority and 3 being lowest priority).

The data_parsing_format_flag is defined in accordance with the data_parsing_format value.

The extra_identifier_length setting is used to define the extra_identifier field, and the extra_identifier field in turn is the identifier or group of identifiers described the following descriptor loop.

The Action Notification Table (ANT), one application of the generic MPEG structure given in Table 3, will now be described.

The action notification table (ANT) is based on a general-purpose table structure of the type previously discussed. It may be used to instruct a set top box, or group of set top boxes, to carry out a particular action.

Examples of actions to be carried out by the receiver/decoder include the downloading of software; automatic channel scanning; rebooting of the receiver/decoder; refreshing programme catalogues (such as a video-on-demand catalogue); and displaying a message to the user of the set top box (audience messaging). The Table II) extension field is used in the ANT to identify the action required.

An ANT may be targeted at set top boxes of a particular kind (for example, from a particular manufacturer) or even individual set top boxes by means of targeting descriptors. These may, for example, be placed in the common descriptor loop of the ANT table. By processing the targeting descriptors in the common descriptor loop, a set top box may determine whether the action is to be carried out by that set top box. This processing of the targeting and action information may, for example, be carried out by an application programme running on the set top box.

Table 4 below describes the scheduled_content_download_descriptor data structure which is used to transfer specific information regarding the scheduling of downloads of content to the hard disk. This descriptor forms part of an Action Notification Table (ANT) based on the generic data structure shown in Table 3.

TABLE 4

SCHEDULED_CONTENT_DOWNLOAD_DESCRIPTOR

| Name | Unit | Size (bits) | Default value |
|---|---|---|---|
| Scheduled_content_download_descriptor( ) { | | | |
|   Descriptor_tag | Uimsbf | 8 | Tbd |
|   Descriptor_length | Uimsbf | 8 | |
|   Download_flag | Bslbf | 1 | 0: automatic 1: manual |
|   Type | Bslbf | 2 | 0: scheduled 1: immediate 2, 3: reserved for future use |
|   Periodicity | Bslbf | 2 | 0: not periodic 1: daily 2: weekly 3: monthly |
|   Reserved | Bslbf | 3 | 111 b |
|   Content_id | Bslbf | 8 | |
|   Original_network_id | Uimsbf | 16 | |
|   Transport_stream_id | Uimsbf | 16 | |
|   UTC_date_time_start | Uimsbf | 40 | |
|   UTC_date_time_estimated_stop | Uimsbf | 40 | |
| } | | | |

The possible values for download_flag are as follows:

| Value | Comment |
|---|---|
| 0 | The download is performed from the main broadcast stream automatically |
| 1 | The download can be performed through the IP network access with user consent |

The possible values for type are as follows:

| Value | Comment |
|---|---|
| 0 | Immediate download |
| 1 | Scheduled download |
| 2 | Reserved for future use |
| 3 | Reserved for future use |

The scheduled download setting mentioned above allows an automatic content download to be programmed periodically (once a day for a month at 3:00 am, for example) until the operation is successful.

The periodicity setting defines the behaviour of the receiver/decoder when the download process starts for a scheduled action. This periodicity is only available between the UTC_date_time_start and the UTC_date_time_estimated_stop values for a scheduled action.

The UTC_date_time_start setting gives the scheduled date and time for content download.

It is encoded in UTC (universal time code), in the same format as specified by the DVB standard in the TDT and TOT tables.

The UTC_date_time_estimated_stop setting indicates the date of availability for the code download based on the estimated download duration.

Table 5 below describes the display_rule_descriptor structure, which is also used in conjunction with the generic table shown in Table 3 and contains information regarding rules to be applied to particular programmes.

TABLE 5

DISPLAY_RULE_DESCRIPTOR

| Name | Default value |
|---|---|
| Display_rule_descriptor( ) { | |
|     Descriptor_tag | TBD |
|     Descriptor_length | |
|     reserved | |
|     Content_id | |
|     Type of content | |
|     Content classification | |
|     number of loops (n) | |
|     For (i=0; i<n; i++) { | |
|         user profile matching criteria | |
|     } | |
|     number_of_allowed_display | 0 = no limitation |
|     number of loops (n2) | |
|     For (i=0; i<n2; i++) { | |
|         forbidden preceding type | 0 = none |
|         depth of the constraint (number of events) | 0 = none |
|         depth of the constraint (minutes) | 0 = none |
|         forbidden following type | 0 = none |
|         depth of the constraint (number of events) | 0 = none |
|         depth of the constraint (minutes) | 0 = none |
|     } | |
|     number of loops (n3) | |
|     For (i=0; i<n3; i++) { | |
|     { | |
|         Forbidden_preceding_content_id | 0 = none |
|         Forbidden_following_content_id | 0 = none |
|     } | |
|     number of loops (n4) | |
|     For (i=0; i<n4; i++) { | |
|         Allowed_display_day_time_slot | |
|     } | |
|     number of loops (n5) | |
|     For (i=0; i<n5; i++) { | |
|         Forbidden_display_day_time_slot | |
|     } | |
|     number of loops (n6) | |
|     For (i=0; i<n6; i++) { | |
|         Content_display_allowed_channels_numbers | |
|     } | |
| } | |

In the above example, the flexibility of the rules can be seen from the number of different parameters (forbidden preceding content ID, allowed day timeslot, and so on) which can be specified.

Both the scheduled_content_download_descriptor (Table 4) and the display_rule_descriptor (Table 5) relate to a single piece of content uniquely identified by the content_id value.

It should be borne in mind that the VCMT table and corresponding descriptors described above are merely examples. Other descriptors, and other means of transferring the rules, such as more application-specific messages and tables, are of course possible.

In variants of the preferred embodiment, the Virtual Channel Information Message (VCIM) and/or other aspects of the personalised advertisements and virtual channel systems are replaced by MPEG tables of the type described above. The required modifications to the above tables are not unduly difficult for a person skilled in the art and will not be described in further detail here. Furthermore, the use of the parser described above removes the need for many changes to the relevant applications in order for them to work with the new tables.

The format of the profile data will now be described in more detail.

In order to assist the manipulation of the user profile, a certain number of distinct profile categories are defined, each with a unique number, corresponding name/tag, and set of possible values. In some cases the possible values are essentially boolean (yes/no), and in other cases the possible values correspond to a limited number range (such as for the x_preference categories). In each case, however, the profile categories can be represented as unsigned integers (similar to the enum type in C).

A typical set of categories is given in Table 6.

TABLE 6

PROFILE CATEGORIES

| Number | Name | Possible values |
|---|---|---|
| 1 | House_type | {house, apartment} |
| 2 | Age | {less than 18, 18 to 25, 26 to 36, 37 to 49, 50 to 59, 60 upwards} |
| 3 | Have_pets | {yes, no} |
| 4 | Region_type | {city, country} |
| 5 | Own_car | {yes, no} |
| 6 | Car_type | {estate, hatchback, sports car, off-road vehicle, people carrier} |
| 7 | Marital_status | {married, single} |
| 8 | Children | {yes, no} |
| 9 | Sex | {male, female} |
| 10 | Country | {France, UK, Germany, . . . } |
| 11 | Region/County [within country] | {0, 1, 2, 3, 4, 5, 6, 7, . . . } |
| 12 | Region_type2 | {inland, by sea} |
| 101 | Sports_preference | {0, 1, 2, 3, 4} |
| 102 | Travel_preference | {0, 1, 2, 3, 4} |
| 103 | News_preference | {0, 1, 2, 3, 4} |
| 104 | Movies_preference | {0, 1, 2, 3, 4} |
| 105 | Music_preference | {0, 1, 2, 3, 4} |
| 106 | Food_preference | {0, 1, 2, 3, 4} |

The Profile Manager maintains a table of each of the chosen profile categories. Categories can be added or deleted by special messages from the broadcast centre and/or conventional software downloads. The categories can also be individually browsed and set by the user; for the various xxx_preference categories, for example, a slider set from 1 to 5, or "STRONG DISLIKE" to "STRONG LIKE", and so on (corresponding to actual values of 0 to 4), can be adjusted.

As can be seen, the categories vary between those—such as pets, children, and so on—which can ideally only be set by the user (directly, using the Profile Manager, or indirectly, by a message sent from the broadcast centre in response to information supplied by the user to the broadcaster) and those categories—such as the xxx_preference categories—which can be set by observing the user's viewing habits. Further categories, such as the country and region/county category, can be set by the broadcast centre, receiver/decoder or other entity based on subscriber identification numbers (often region-specific) or other identifiers (such as transmitted ID, cable network subnet, IP address range, router ID, and so on).

A more detailed illustration of the structure of target data is given below in Table 7.

TABLE 7

EXAMPLES OF TARGET DATA

| Profile category | Value | Mandatory? | Weighting |
|---|---|---|---|
| SPORTS HOLIDAYS FOR CHILDREN | | | |
| 101 (Sports_preference) | 4 | no | 1 |
| 8 (Children) | {yes} | yes | 2 |
| BEAUTY TREATMENTS IN CHAIN OF SALONS | | | |
| 9 (Sex) | {female} | yes | 1 |
| 4 (Region_type) | {city} | no | 2 |
| BEACH HOLIDAY IN REGION 3 (Marseilles) | | | |
| 4 (Region_type) | {3} [Marseilles] | yes | −1 |
| 102 (Travel_preference) | 4 | no | 1 |
| 12 (Region_type2) | {inland} | yes | 3 |
| SUBSCRIPTION TO ADULT CHANNEL | | | |
| 2 (Age) | {less than 18} | yes | −1 |
| 9 (Sex) | {male} | no | 1 |

It can be seen from the above that a value, a weighting and a mandatory flag are provided, to allow more flexible customization. A weighting of −1 (preferably in combination with a mandatory criteria) indicates that the given value should be avoided, rather than matched.

Examples of profile information (transmitted in the VCIMs) are given in Table 8.

TABLE 8

EXAMPLES OF PROFILE INFORMATION (in VCIM)

| Profile category | Weight | Condition |
|---|---|---|
| LATE NIGHT TIME SLOT | | |
| 106 (Food_preference) | +3 | — |
| 2 (Age) | — | not {less than 18} |
| EARLY AFTERNOON | | |
| 2 (Age) | −2 | — |
| MORNING | | |
| 103 (News_preference) | +2 | — |

The profile category value identifies the category to modify, and the weight value indicates the adjustment, if any, which is to be applied to user profiles (typically xxx_preference profile categories). The condition field is quite flexible, and in the preferred embodiment is encoded as a string containing an expression to be evaluated.

A system for evaluating the suitability of advertisements, based on the above data structures, is shown in FIG. 15. Initially, a current_advertisement loop counter variable is reset in step 9600. In step 9602, a check is made that the current advertisement (determined by current_advertisement) fulfills the necessary criteria, including checking that all of the mandatory target attributes are fulfilled. Other criteria may include ensuring that the advertisement hasn't been repeated within a given time period.

In step 9604 (assuming the advertisement fulfills the criteria), a score is calculated for the advertisement and stored in a temporary array. In 9606 the current_advertisement variable is incremented, and tested in step 9608. At the end of the loop in step 9610, the array of scores is examined and the highest-scoring advertisement (which also fulfills the necessary criteria) is chosen.

The step of calculating the score for a particular advertisement is shown in more detail in FIG. 16. In step 9700 the total_weight, score and cur_attribute variables are reset. First of all, in step 9702, the weighting of the current attribute is tested. If it is negative—in other words if a prohibited value is specified—the attribute is ignored, and loop is exited (by jumping to step 9716). In step 9704, the total weighting is increased by the appropriate value. As can be seen from the following steps, the algorithm is designed such that the score ranges between 0 and 1.

In step 9706 various intermediate variables are calculated (in this case for the ease of illustration of the following steps); the cur_category variable is set to the category (such as 101, Sports_preference) of the current attribute and the cur_usr_profile is set to the actual value of that category in the current user profile. In step 9708 the type of category is tested, such that the categories which have a numeric range, such as Sports_preference, Music_preference, and so on, are subjected to a more complex scoring algorithm (step 9714) which takes into account the varying degrees by which the profile values agree or disagree with the target value. Simple categories are subject to a simpler test in step 9710, resulting in the score being incremented by the appropriate weighting if the values agree (step 9712), and being unchanged if not. In steps 9716 and 9718, the loop counter (cur_attribute) is incremented, and tested. At the end, the total weighted score is calculated in step 9720.

This system does not take into account the additional profile information provided in VCIMs, but modifications (to steps 9712 and 9714) to take this into account can be implemented along the lines of the processes described above. Other systems for matching profile data, having differing degrees of complexity, may also be constructed.

The precise details of the implementation of the various functions described above, and their distribution between hardware and software, are a matter of choice for the implementor and will not be described in detail. It is, however, noted that dedicated integrated circuits capable of performing the operations required in the receiver/decoder are commercially available or can be readily designed, and these can be used as the basis for a hardware accelerator, or more preferably modified to produce a dedicated hardware accelerator, to implement various of the operations required, thereby reducing the processing power required to run the software. However, the operations required may be implemented in software if sufficient processing power is available.

The modules and other components have been described in terms of the features and functions provided by each component, together with optional and preferable features. With the information given and specifications provided, actual implementation of these features and the precise details are left to the implementor. As an example, certain modules could be implemented in software, preferably written in the C programming language and preferably compiled to run on the processor used to run the application; however, some components may be run on a separate processor, and some or all components may be implemented by dedicated hardware.

The above modules and components are merely illustrative, and the invention may be implemented in a variety of ways, and, in particular, some components may be combined with others which perform similar functions, or some may be omitted in simplified implementations. Hardware and software implementations of each of the functions may be freely mixed, both between components and within a single component.

It will be readily understood that the functions performed by the hardware, the computer software, and such like are performed on or using electrical and like signals. Software implementations may be stored in ROM, or may be patched in FLASH.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A receiver/decoder in a digital television system, comprising:
    a receiver that receives a plurality of broadcast channels, each broadcast channel comprising a plurality of programs;
    a storage medium that stores the plurality of received programs;
    computer readable code executable by a processor that selects a first stored program from the plurality of stored programs for output; and
    a memory that stores program sequence rules,
    wherein the computer readable code executed by the processor is configured to:
        respond to an identifier identifying a category of the stored program to be selected for output and identifiers indicating a minimum and maximum number of stored programs to be selected for output during a time slot in a broadcast message received by the receiver/decoder, wherein the broadcast message indicates that at least one stored program must be selected for output during the time slot; and
        apply the program sequence rules to the selection of the first stored program, the program sequence rules limiting the minimum and maximum number.

2. The receiver/decoder according to claim 1, wherein the broadcast message comprises timing information relating to the time slot.

3. The receiver/decoder according to claim 2, wherein the broadcast message comprises the duration of the time slot during which selected stored programs are output.

4. The receiver/decoder according to claim 1, wherein the time slot corresponds to a program break on one of the plurality of broadcast channels, and wherein the first stored program is an advertisement.

5. The receiver/decoder according to claim 1, wherein the computer readable code executable by the processor is configured to create a log file of the selected stored programs.

6. The receiver/decoder according to claim 1, wherein the storage medium stores at least one user profile,
    wherein the computer readable code executed by the processor is configured to select the first stored program as a function of the at least one user profile and of control data associated with the plurality of stored programs, the control data comprising profile data of the first stored program, the selection being made by matching the profile data with the user profile.

\* \* \* \* \*